United States Patent
Matsuo

(10) Patent No.: US 7,123,420 B2
(45) Date of Patent: *Oct. 17, 2006

(54) IMAGING OPTICAL SYSTEM

(75) Inventor: Eiki Matsuo, Suwa (JP)

(73) Assignee: NEC Viewtechnology, Ltd., Tokyo-to (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/205,356

(22) Filed: Aug. 16, 2005

(65) Prior Publication Data

US 2006/0077567 A1 Apr. 13, 2006

Related U.S. Application Data

(62) Division of application No. 10/826,479, filed on Apr. 16, 2004, now Pat. No. 6,950,240, which is a division of application No. 10/031,026, filed as application No. PCT/JP00/04641 on Jul. 12, 2000, now Pat. No. 6,771,427.

(30) Foreign Application Priority Data

Jul. 14, 1999 (JP) ................................. 11-200381

(51) Int. Cl.
G02B 9/00 (2006.01)

(52) U.S. Cl. ....................... 359/649; 359/650; 359/651

(58) Field of Classification Search ................. 359/649
See application file for complete search history.

(56) References Cited

U.S. PATENT DOCUMENTS

| | | | |
|---|---|---|---|
| 5,274,406 A | 12/1993 | Tejima et al. ................. 353/70 |
| 5,294,980 A | 3/1994 | Matsugu et al. ............. 356/401 |
| 5,442,413 A | 8/1995 | Tejima et al. ................. 353/69 |
| 5,570,140 A | 10/1996 | Toide et al. ................. 348/744 |
| 5,594,588 A | 1/1997 | Togino ........................ 359/631 |
| 5,716,118 A | 2/1998 | Sato et al. .................... 353/98 |
| 5,831,776 A | 11/1998 | Sasaya et al. ................ 359/754 |
| 5,871,266 A | 2/1999 | Negishi et al. ............... 353/98 |
| 5,986,806 A | 11/1999 | Sugawara .................... 359/557 |
| 6,075,597 A * | 6/2000 | Olshausen .................. 356/450 |
| 6,201,648 B1 | 3/2001 | Togino ........................ 359/728 |
| 6,639,734 B1 | 10/2003 | Omura ........................ 359/730 |
| 6,771,427 B1 | 8/2004 | Matsuo ........................ 359/649 |
| 6,879,444 B1 * | 4/2005 | Matsuo ........................ 359/649 |
| 6,947,221 B1 * | 9/2005 | Matsuo ........................ 359/649 |
| 6,950,240 B1 * | 9/2005 | Matsuo ........................ 359/649 |

(Continued)

FOREIGN PATENT DOCUMENTS

EP 0 571 972 A2 12/1993

(Continued)

Primary Examiner—Jordan M. Schwartz
Assistant Examiner—Jessica Stultz
(74) Attorney, Agent, or Firm—Ladas & Parry LLP

(57) ABSTRACT

A luminous flux, from one conjugate surface (A), having an opening angle of at least 10° sequentially passes through a first optical system (30) having a luminous flux convergent action in the vicinity of its reference axis and a second optical system (31) having a luminous flux divergent action in the vicinity of its reference axis, and converges on another conjugate surface (B). A specific condition is given to the converging distance of each converging point at a luminous flux section including a principal ray according to the v passing position of the luminous flux through the first optical system (30) to thereby implement an oblique-incident optical system having a half angle of at least 60° and a comparatively simple structure irrespective of a type of an optical element used.

4 Claims, 25 Drawing Sheets

U.S. PATENT DOCUMENTS

| | | | |
|---|---|---|---|
| 2001/0017692 A1 | 8/2001 | Tanitsu | 355/67 |
| 2004/0114255 A1 | 6/2004 | Matsuo | 359/728 |
| 2004/0114256 A1 | 6/2004 | Matsuo | 359/754 |

FOREIGN PATENT DOCUMENTS

| | | |
|---|---|---|
| EP | 0 633 491 A1 | 1/1995 |
| EP | 0 660 155 1 | 6/1995 |
| EP | 0 744 643 A2 | 11/1996 |
| JP | 1-257834 | 10/1989 |
| JP | 5-134213 | 5/1993 |
| JP | 5-203871 | 8/1993 |
| JP | 5-273460 | 11/1993 |
| JP | 5-303055 | 11/1993 |
| JP | 5-333269 | 12/1993 |
| JP | 6-133311 | 5/1994 |
| JP | 6-265814 | 9/1994 |
| JP | 7-013157 | 1/1995 |
| JP | 7-151994 | 6/1995 |
| JP | 7-191274 | 7/1995 |
| JP | 9-43536 | 11/1996 |
| JP | 9-179064 | 7/1997 |
| JP | 10-153736 | 6/1998 |
| JP | 10-206791 | 8/1998 |
| JP | 10-239631 | 9/1998 |
| JP | 10-282451 | 10/1998 |
| JP | 11-237543 | 8/1999 |
| JP | 2000-89227 | 3/2000 |
| WO | 97/01787 | 9/1997 |

\* cited by examiner

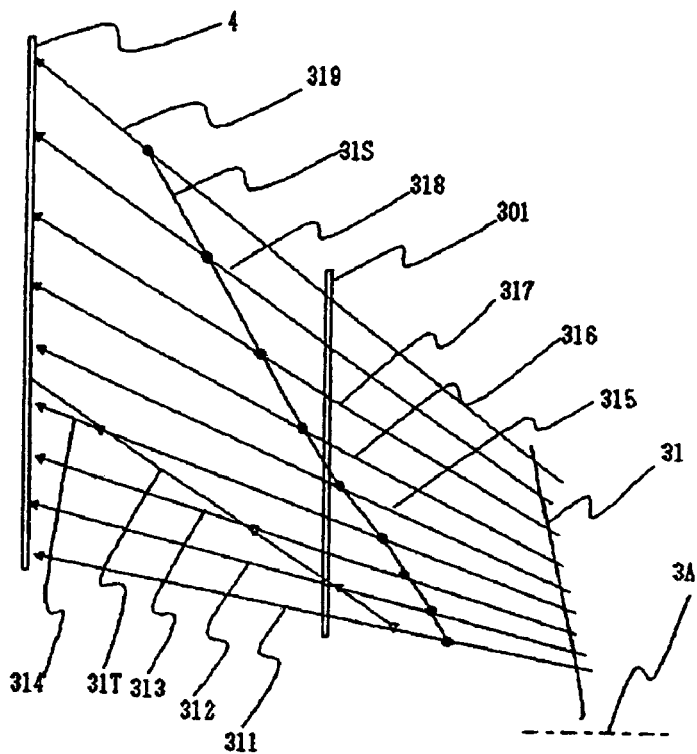
F I G. 15
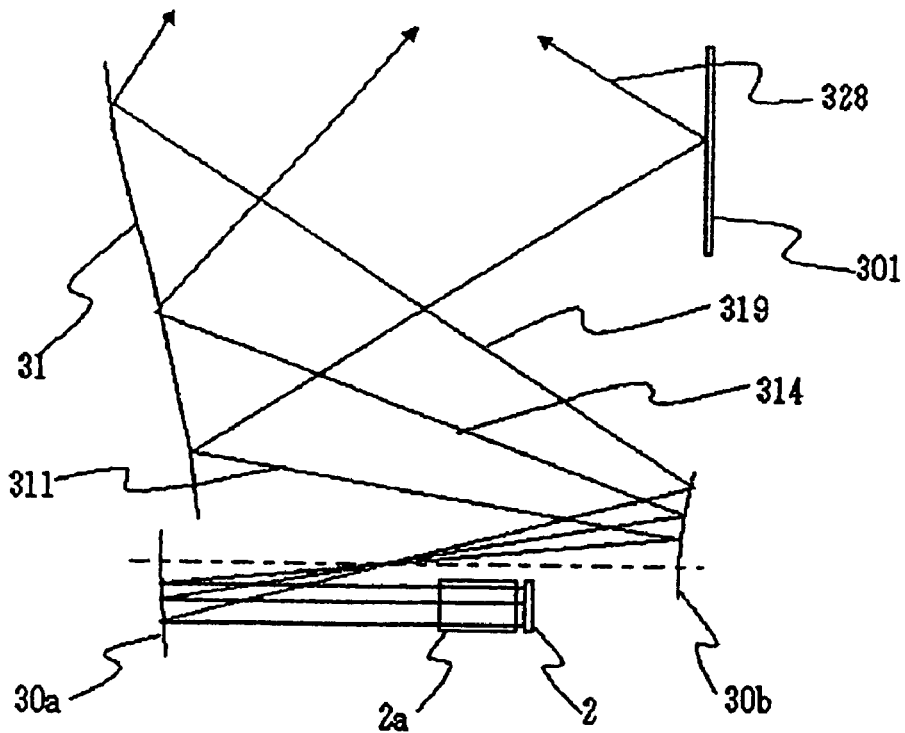
F I G. 16

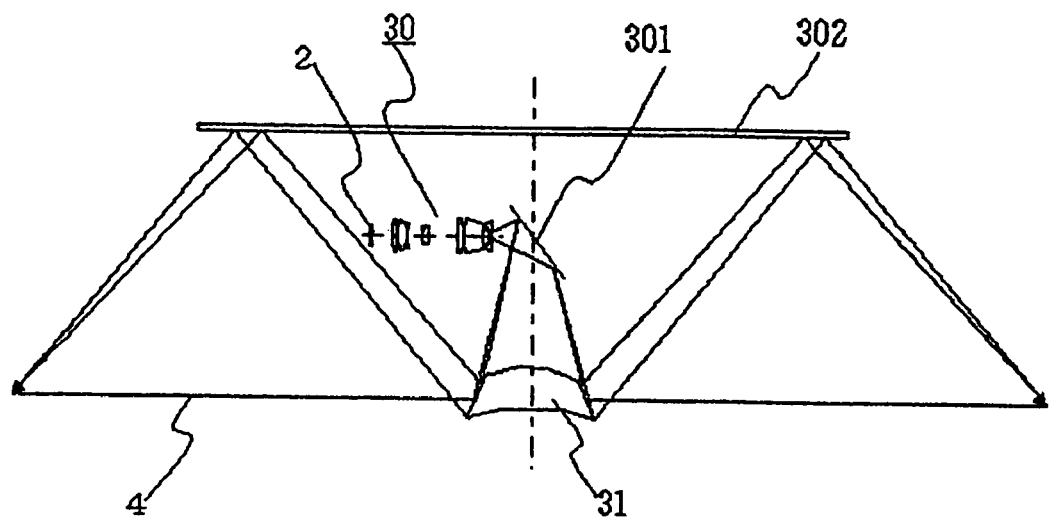
F I G. 17
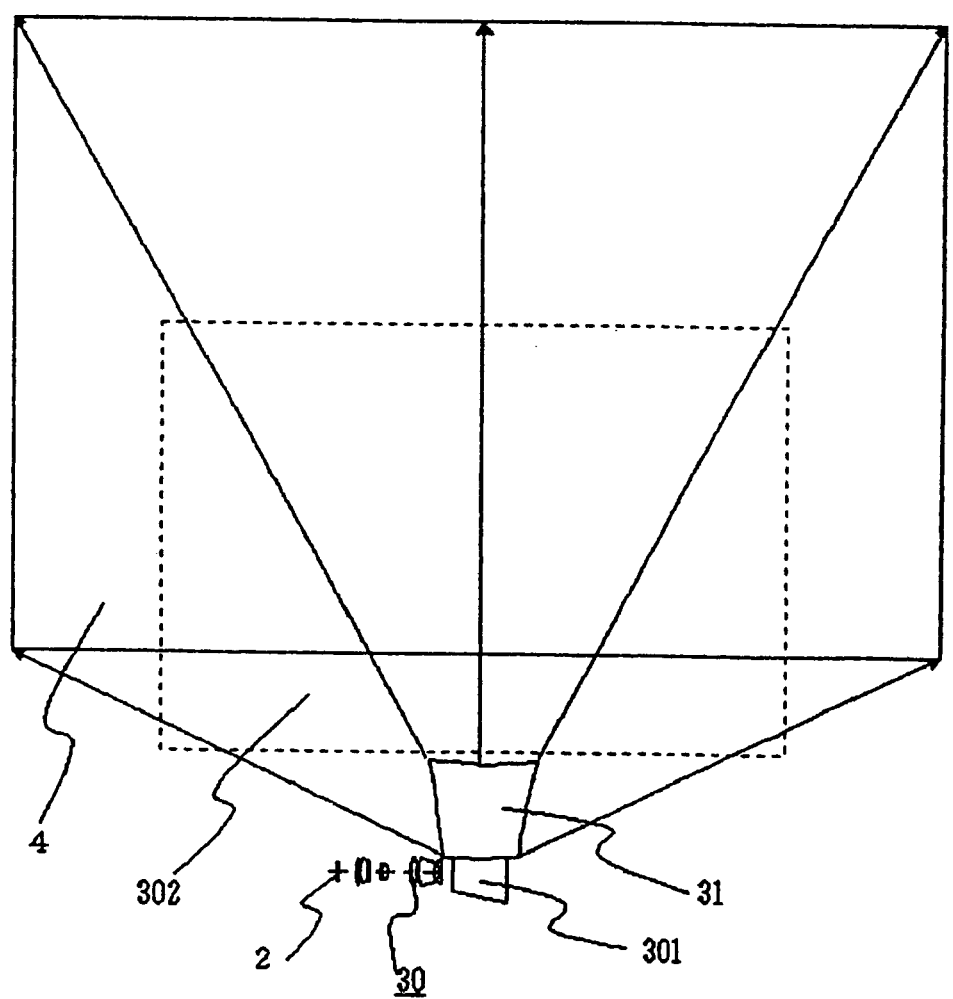
F I G. 18

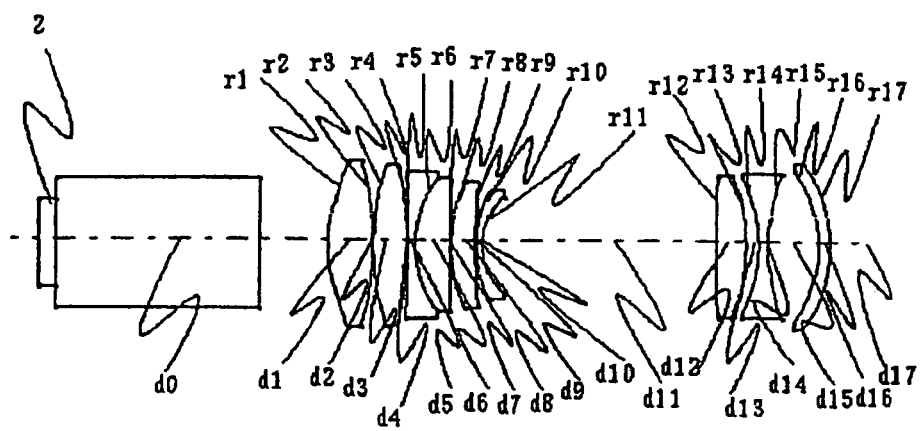
F I G. 21
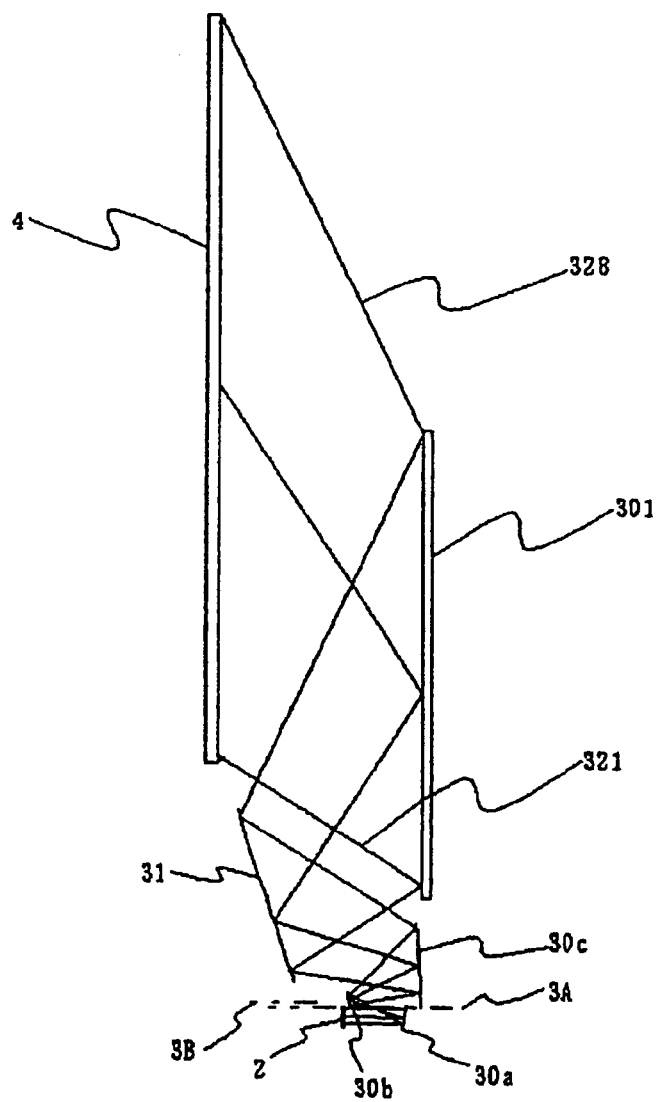
F I G. 22

IMAGING OPTICAL SYSTEM

CROSS-REFERENCE TO RELATED APPLICATIONS

This patent application is a divisional application of U.S. Ser. No. 10/826,479, filed on Apr. 16, 2004, now U.S. Pat. No. 6,950,240 which is a divisional of U.S. Ser. No. 10/031,026, filed on Jan. 14, 2002, now U.S. Pat. No. 6,771,427 which is the U.S. National Stage of PCT International Patent Application No. PCT/JP00/04641, filed on Jul. 12, 2000. This application is also related to U.S. Pat. No. 6,879,444 to Matsuo, issued Apr. 12, 2005 and co-pending U.S. Ser. No. 10/729,437, filed on Dec. 5, 2003.

TECHNICAL FIELD

The present invention relates to an imaging optical system capable of reading an image from an oblique direction and of projecting an image.

BACKGROUND ART

Imaging optical systems relating to oblique image reading or image projection (hereinafter referred to simply as "oblique-incidence imaging optical systems") are classified into oblique-incidence imaging optical systems of a decenter system and oblique-incidence image-forming optical systems of a tilt system.

FIG. 24 illustrates the basic principle of the oblique-incidence imaging optical system of the decenter system. In this oblique-incidence imaging optical system of the decenter system, an object plane 4 and image plane 2, which are conjugate planes, are basically parallel to each other, and the optical axis 3A of an image-forming optical system 30 is perpendicular to both the object plane 4 and the image plane 2. To realize an oblique-incidence imaging optical system, for example, an image detecting region 201 included in the image plane 2 is shifted below the optical axis 3A. Consequently, an image pick-up region 401 included in the object plane 4 is shifted upward as viewed in FIG. 24 and a oblique-incidence image-forming optical system can be realized without using any special optical system. The decenter system is advantageous in that any excessive distortion does not occur. However, the same system is disadvantageous in that the image circle of the image-forming optical system 30 must be large to displace the optical axis 3A, the correction of aberration is difficult and the imaging optical system 30 is large.

FIG. 25 illustrates the basic principle of the tilt system. The tilt system differs greatly from the decenter system in that the optical axis 3A of an imaging optical system 30 is oblique to an object plane 4, and an image plane 2 is oblique to the optical axis 3A. Respective prolongations of the image plane 2, the object plane 4 and the principal plane of the imaging optical system 30 intersect on a line A of intersection to meet Scheimpflug's principle, i.e., an imaging condition for the tilt system. The tilt system is advantageous in that the imaging optical system 30 is not excessively large and resolving power is comparatively high. The same system is disadvantageous in that a new distortion occurs. FIG. 26 shows a typical example of such a distortion, which can be readily understood from the examination of imaging magnification illustrated in FIG. 25.

Oblique-incidence imaging optical systems are classified into those of the decenter system, those of the tilt system and those of a composite system having the characteristics of both the decenter and the tilt system. The image-forming optical system must meet predetermined conditions about particulars including resolving power and distortion required of the optical system. Various devices have been proposed to solve problems in those systems and efforts have been made to provide optical systems answering purposes. Some examples of prior art optical system will be described.

FIGS. 27(a) and 27(b) show a projection lens for a projector disclosed in JP-A No. Hei 05-273460 in a sectional view. A projection lens 30 consisting of refracting optical elements, and an image-forming device 2 are moved perpendicularly to the optical axis 3A of the projection lens 30 relative to each other to realize an oblique-incidence imaging optical system. To avoid moving a condenser lens 301 disposed near the image-forming device 2, the optical axis of the projection lens 30 is tilted when moving the projection lens 30. Therefore, it is considered that this oblique-incidence imaging optical system is basically of the decenter system and uses tilting for the degree of freedom of correction. This optical system achieves image projection in a maximum field angle 2ω of about 51°.

FIG. 28 shows a projector disclosed in U.S. Pat. No. 5,871,266 to the applicant of the present invention patent application in a sectional view. The projector includes, as essential components, an illuminating system 1 including a light source, an image-forming device 2 including a liquid-crystal display or the like, and an imaging system 3. The illuminating system 1 and the imaging system 3 are optimized to realize an oblique-incidence imaging optical system. In a concrete example, the imaging system 3 comprises only a small number of reflecting mirrors. A light beam emitted by the illuminating unit 1 is decomposed into light beams of three primary colors by dichroic mirrors 2a and 2b to illuminate three reflecting image-forming devices 2g, 2h and 2i. Light beams reflected by the reflecting image-forming devices 2g, 2h and 2i are combined by the dichroic mirrors 2a and 2b, and the light beams travel toward the imaging system 3. The imaging system 3 has three reflecting mirrors 3a, 3b and 3d. The light beams from the reflecting image-forming devices 2g, 2h and 2i are reflected by the reflecting mirrors 3a, 3b and 3d to form an image on a screen 4, not shown. In this specification, the significance of the oblique-incidence imaging optical system included in the projector is discussed minutely. An example applied to a thin rear projection display capable of achieving image projection in a maximum field angle 2ω exceeding 100°. This rear projection display is, basically, of the decenter system.

Although such an epoch-making projector can be realized, the system disclosed in U.S. Pat. No. 5,871,266 has some disadvantages. The reflecting mirrors of the imaging system, as compared with refracting optical elements, must be formed in a high surface accuracy, which will be readily understood from the imagination of the state of reflection of imaging light by the reflecting mirrors. For example, suppose that a light beam emitted by the image-forming device to be focused on a point on a screen forms a spot in a region of a reflecting surface. If the region has a form error of λ/4, where λ is, for example, 0.55 μm, a wave aberration of about λ/2 is produced. This wave aberration causes a nonnegligible reduction in the resolving power of the imaging optical system. Thus, the accuracy of the catoptric system is affected significantly by waviness errors in the reflecting surface.

Another disadvantage of the system is the incidence angle of a light beam from the image-forming device. As stated in claims, a divergent light beam diverging at a divergence angle of 8° or below is used to realize a simple oblique-incidence imaging optical system. In this patented invention, all the systems including an illuminating system are optimized to enhance the efficiency of light. However, the system has only a narrow application field because of various restrictions on the size of an available light source, and the size and costs of the device.

An invention disclosed in JP-A No. Hei 10-206791 relates to a projector of the decenter system. As shown in FIG. 29, this invention includes an imaging system 30 employing decentered optical elements and free-form surfaces to increase the degree of freedom of design, and realizes a projection system having a maximum field angle 2ω exceeding 68°. The imaging system 30 is used as an imaging system for oblique projection as shown in FIG. 30. In FIG. 30, two conjugate planes 2 and 4 are substantially parallel. Although such decentered optical elements are employed, the field angle is not increased and, on the other hand, difficulty in fabricating and assembling parts is enhanced.

Some known optical systems of the decenter system have been described by way of example. Known optical systems of the tilt system will be described hereinafter.

FIG. 31 illustrates an invention disclosed in U.S. Pat. No. 5,274,406 relating to a projector particularly for a rear-projection display. This projector includes a symmetric projection lens 30 consisting of refracting optical elements shown in FIG. 32, and a free-form surface mirror 301 having minute setbacks similar to those of a Fresnel lens as shown in FIG. 33(b) and disposed near an image plane. The optical axis of the projection lens 30 is tilted relative to a screen 4 and an image-forming device 2 to form the rear-projection projector in a small depth. A distortion resulting from the tilting of the optical axis is corrected by a free-form surface mirror shown in FIG. 33(a), and problems relating to the mismatch of imaging conditions resulting from the use of such mirrors are dealt with by forming minute setbacks similar to those of a Fresnel lens in their surfaces.

Thus, a rear-projection display provided with a 36 in. screen having a diagonal length 36 inch is formed in a thickness of 28 cm, which is smaller than a target thickness, because it is said that a normal number of the target thickness in inch equal to a normal number of the diagonal of the screen in centimeter. Although the rear-projection display can be thus formed in a small thickness, the distance $D_1$ between the projection lens 30 and the free-form surface mirror 301 along an optional light beam is greater than the distance $D_2$ between the free-form surface mirror 301 and the screen along the same light beam, and hence the free-form surface mirror 301 is necessarily large. Therefore, the fabrication of the free-form surface mirror having the setbacks similar to those of a Fresnel lens is very difficult. The free-form surface mirror 301 having a surface resembling that of a Fresnel lens and employed to prevent the reduction of resolving power has the finite stepped construction and the steps reduces resolving power.

FIG. 34 shows other oblique-incidence imaging optical systems of the tilt system disclosed in JP-A Nos. Hei 06-265814 and Hei 07-151994. These oblique-incidence imaging optical systems employs a plurality of optical systems of the tilt system to correct a distortion. For example, an oblique-incidence imaging optical system shown in FIG. 35 has two optical systems of the tilt system. A light beam emitted by an image-forming device included in a plane 2 is focused by a first imaging system 3 to form an intermediate image on a plane 4. A second imaging system 3' forms an image of the intermediate image on a screen 4'. Theoretically, it is possible to correct the distortion and to prevent the reduction of resolving power by properly determining the angle, magnification, focal length and such of each optical system so as to meet predetermined conditions. Since the respective optical axes of the imaging systems 3 and 3' of this oblique-incidence imaging optical system intersect the plane 4 on which the intermediate image is formed at predetermined angles. Therefore the light beam must travel from the optical system 3 to the optical system 3' without being shaded. Generally, a pupil-coupling device, such as a decentered Fresnel lens as shown in FIG. 36, is disposed at a position where the intermediate image is formed to enable the light beam to travel from the optical system 3 to the optical system 3' without being shaded. For example, if the image-forming device has minimum pixel construction like a liquid crystal panel, a moiré pattern is formed by interference with the periodic construction of the Fresnel lens. This problem is solved by displacing the pupil-coupling device from a position corresponding to the intermediate image.

This oblique-incidence imaging optical system is disadvantageous in that the respective optical axes of the optical systems 3 and 3' are inclined at a large angle to the intermediate image 4 or the image-forming device 2 and it is often difficult to meet mechanical requirements. Detailed description of the problem will be omitted herein. The pupil-coupling device shown in FIG. 36 is one of problems difficult to solve.

FIG. 37 shows an imaging optical system disclosed in JP-A No. Hei 07-13157. A collimated light beam emitted by a light source 1a falls on an image-forming device 2. A first paraboloidal reflector 3a concentrates the light beam reflected by the image-forming device 2 on the pupil of a projection lens 3b. The light beam traveled through the projection lens 3b is reflected by a second paraboloidal reflector 3c to form an enlarged image on a screen 4. Basically, this imaging optical system is of the tilt system. The first paraboloidal reflector 3a is used for coupling the projection lens 3b and an illuminating light beam, and the second paraboloidal reflector 3c is used to make the light beam fall on the screen 4 in a direction at a fixed angle to the screen 4 to form a thin rear projection display. Although it is unknown whether the invention is practically realizable because concrete examples are not mentioned in the specification, it is considered that this imaging optical system is unable to meet practical optical requirements.

FIG. 38 shows an imaging optical system of the tilt system disclosed in JP-A No. Hei 09-179064. This imaging optical system, similarly to those disclosed in U.S. Pat. No. 5,871,266 and JP-A No. Hei 07-13157, includes, in combination, an imaging system 30 consisting of refracting optical elements, and a concave reflector 31. A light beam emitted by an image-forming device 2 travels through the optical system 30 consisting of refracting optical elements 3a to 3g shown in FIG. 39, is reflected by the concave reflector 31 and falls obliquely on a screen 4. This imaging optical system utilizes the characteristics of an afocal system for correcting a distortion produced by the tilt system.

When an afocal system is constituted of two optical elements 30 and 31 such that the distance between the optical elements 30 and 31 is equal to the sum of the respective focal lengths of the optical elements 30 and 31 as shown in FIG. 40, the magnification of the afocal system remains constant regardless of an object distance. A distortion can be corrected by constituting such an optical system of a refracting optical element 30 having a positive focal length and a concave reflector 31 having a positive focal length, and by making a light beam fall on a screen 4 at a fixed angle to the screen 4.

In an embodiment of this known optical system, a light beam falls on the screen 4 in an object plane at a large angle of, for example, 70° to a normal to the screen 4. A decentered optical element and a free-form surface are employed to secure a degree of freedom to reduce the distortion further and to improve resolving power. This system is disadvantageous in that the afocal system is constituted of the two optical elements, and the distance between the optical elements 30 and 31 must be unavoidably increased to form an enlarging system; that is, when the distance between the projection lens 30 and the concave reflector 31 along a light beam is D1 and the distance between the concave reflector 31 and the screen 4 along a light beam is D2, D1>D2 for most part of the light beam and hence the concave reflector 31 must be necessarily large, which causes problems in the mass production of the concave reflector 31.

The foregoing examples are techniques mainly relating to projectors. Let us examine some examples of head-mounted displays (HMDs) as other possible use of oblique-incidence imaging optical systems.

Important matters to be taken into account in designing a head-mounted display are: wideness of angle of field (large enlarged image), smallness of dimensions, and lightness.

Regarding angle of field, a necessary size of an image-forming device is substantially dependent on the connection with an angle including an image-forming device when a necessary angle of field is specified, because the size of a pupil is substantially fixed. FIG. 41 shows a standard HMD. A relay optical system 30 focuses a light beam from an image-forming device 2 to form an intermediate image 4, and a concave mirror 31 enlarges the intermediate image to provide an enlarged image. The enlarged image is observed with an eye at a position 303. The concave mirror 31 concentrates principal light beams on the pupil. Basically, this HMD is a coaxial system, which is an optical system easy to design. However, since the eye must be spaced from the concave mirror 31, and the relay optical system 30 needs a space for installation, the HMD is inevitably considerably large.

FIG. 42 shows the optical system of a HMD disclosed in JP-A No. Hei 05-303055. An imaging optical system including a relay optical system 30 focuses a light beam from an image-forming device 2 to form an image, and a concave mirror 31 enlarges the image to provide an enlarged image. The enlarged image is observed with an eye at a position 301. Basically, this HMD is the same in configuration as the aforesaid HMD. This HMD omits a beam splitter and employs a decentered system to form the HMD in s small thickness. Thus, this HMD is an oblique-incidence imaging optical system of the tilt system.

A HMD disclosed in JP-A NO. 07-191274 is obtained by introducing improvements in the HMD disclosed in JP-A No. Hei 05-303055. As shown in FIGS. 43 and 44, one concave mirror is replaced with a plurality of convex mirrors and concave mirrors to improve the correction of aberration. Addition of the convex mirror increases the degree of freedom of high aberration correction and widens the width of design. The reflector closest to the eye is a concave mirror. A HMD in an embodiment has a relay optical system 30 consisting of reflectors and consisted entirely of a catoptric system. This HMD is analogous with the projection optical system of the projector disclosed in U.S. Pat. No. 5,871,266 in constituting the optical system only of reflectors.

FIG. 45 shows a HMD disclosed in JP-A No. Hei 10-239631. This HMD is formed in compact construction by folding the arrangement of the reflectors of the HMD disclosed in JP-A No. Hei 07-191274 in a space. Although the HMD is small, aberration is corrected effectively by means of two refracting surfaces 301 and 304 and two reflecting surfaces 302 and 303. To secure degree of freedom, optical surfaces are free-form surfaces. This system is epoch-making for applications in which two image-forming device s for both eyes can be used and a comparatively large f number is permitted.

Although examples of optical systems in the two fields of application of the oblique-incidence imaging optical system have been described, the oblique-incidence imaging optical system is applicable to various uses, and the field of practical application of the same to various products has been progressively widening. For example, there have been proposed new oblique-incidence imaging optical systems meeting current requirements, such as the oblique-incidence imaging optical system proposed in JP-A No. Hei 10-239631, for the field of HMDs. However, those oblique-incidence imaging optical systems are unsatisfactory in meeting future requirements for wide angle of field and picture quality. The degree of freedom may be increased by increasing reflecting surfaces as mentioned above in connection with JP-A No. Hei 07-191274. However, increase in the number of reflecting surfaces requires forming the reflecting surfaces in high accuracies and increases the cost. Thus further technical research and development in this field is desired.

When the oblique-incidence imaging optical system is applied to a projector or an image pickup system, further improvement of the ability of the oblique-incidence imaging optical system is required, because a projector or an image pickup system requires abilities severer that those required of systems for visual observation. Image-forming devices, such as liquid crystal displays, and image pickup devices, such as CCDs, have been progressively miniaturized and pixels have been reduced to sizes on the order of micrometers. Consequently, optical systems having high resolving power and capable of preventing reduction in light intensity are needed. On the other hand, the miniaturization of devices is advantageous conditions for the miniaturization of optical systems. If an image can be projected at a half field angle exceeding 70° as mentioned in U.S. Pat. No. 5,871,266, a display can be formed in a thickness equal to ⅓ of the thickness of the conventional display, and can be applied to various input/output devices including a videophone system disclosed in JP-A No. Hei 06-133311 as shown in FIG. 46, projectors, thin image readers capable of reading an image at a stroke, such as image scanner, stereoscopic image readers and cameras.

Thus, a technical subject of the present invention is to increase means for realizing an oblique-incidence imaging optical system as much as possible. Unfortunately, the conventional optical systems have some problems in brightness, resolving power, size, productivity and/or costs, and only few conventional oblique-incidence imaging optical systems are widely applicable to many uses.

It is an object of the present invention provides new means for realizing an oblique-incidence image-forming optical system and to apply the same to various uses.

Another object of the present invention is to provide means for realizing a bright oblique-incidence image-forming optical system capable of projecting an image at a half field angle exceeding 70° which could not be achieved by prior art and of controlling distortion.

DISCLOSURE OF THE INVENTION

According to the present invention, it is a first condition that a light beam on a point in a predetermined range contributing to image formation on a first conjugate plane A of conjugate planes in an imaging optical system diverges at a divergence angle of 10° or greater. It is a second condition that an optical system includes, as essential components, a first optical system consisting of a plurality of optical elements and capable of converging a light beam at least around its reference axis, and a second optical system capable of making a light beam diverge at least around its reference axis. A light beam emitted from the first conjugate plane A travels through the first and the second optical system and is converged on a second conjugate plane B.

The optical systems are formed so as to meet predetermined conditions in relation with the optical beam traveling through the optical systems. Suppose that the distance between the first optical system and the second optical system along the reference axis of the first optical system is S1, and the distance between the second optical system and the second conjugate plane B along the reference axis of the second optical system is S2. Suppose, in relation with an optional light beam emerging from the first optical system, that distance to a first converging point where the distance along the reference axis of the first optical system in a section of the light beam including principal rays is the longest is L1, and distance to a second converging point where the distance along the reference axis of the first optical system in a section of the light beam different from the aforesaid section is the shortest is L2. The distance L1 relating to a light beam emerging from a position the nearest to the reference axis of the first optical system among the thus calculated distances L1 is L11, the distance L2 relating to a light beam emerging from a position the nearest to the reference axis of the first optical system among the thus calculated distances L2 is L21, the distance L1 relating to a light beam emerging from a position the remotest from the reference axis of the first optical system among the thus calculated distances L1 is L1$n$, and the distance L2 relating to a light beam emerging from a position the remotest from the reference axis of the first optical system among the thus calculated distances L2 is L2$n$. Then, the following conditions must be satisfied.

$$S1 \leq L11 \leq S1+S2$$

$$S1 \leq L21 \leq S1+S2$$

$$L11/L1n < 0.25$$

$$|L2/L2n| < 1.5$$

In relation with any light beam emerging from a predetermined range on the first conjugate plane A and concentrated on the second conjugate plane B, suppose that the distance between the first and the second optical system along the light beam is D1, and the distance between the second optical system and the second conjugate plane B along the beam is D2. Then, the following condition must be satisfied.

$$D1 < D2$$

Preferably, the imaging optical system meets at least one of conditions expressed by:

$$S1/L11 > 0.6$$

$$(S1+S2)/L2n < 1$$

$$\Delta SL > 0.6$$

where S1 is the distance between the first and the second optical system along the reference axis of the first optical axis, S2 is the distance between the second optical system and the second conjugate plane B along the reference axis of the second optical system, L11 is the distance relating to a light beam emerging from a part the nearest to the reference axis of the first optical system among the distances L1 to the first converging points in a section of the optical beam, L2$n$ is the distance relating to a light beam emerging from a position the remotest from the reference axis of the first optical system among the distances L2 to the second converging point, and $\Delta SL$ is the difference between a maximum S1/L1 and a minimum S1/L1 relating to each light beam.

The imaging optical system is capable of either an imaging function to form an enlarged image of the conjugate plane A on the conjugate plane B or an imaging function to form a reduced image of the conjugate plane B on the conjugate plane A.

Desirably, in the imaging optical system, each of the first and the second optical system includes an optical element having at least one aspherical surface or a free-form surface.

In the imaging optical system, the first optical system may principally comprise refracting optical elements, and the second optical system may principally comprise reflecting optical elements.

In the imaging optical system, the first and the second optical systems may principally comprise reflecting optical elements In the imaging optical system, at least either the first or the second optical system may include an optical element decentered from its reference axis.

In the imaging optical system, at least either the first or the second optical system may include a rotationally symmetric optical element.

In the imaging optical system, each of the first and the second optical system may include rotationally symmetric optical elements having a common axis of rotation symmetry, and the reference axes of the first and the second optical system may be aligned with the axis of rotation symmetry.

In the imaging optical system, all the light beams are inclined at angles not smaller than 45° to a normal to the conjugate plane B.

In the imaging optical system, the divergence of the light beam at a cone angle of 10° or greater is important for the oblique-incidence imaging optical system to maintain a fixed brightness. Thus, the imaging optical system is bright, and the field of application of the oblique-incidence imaging optical system of the present invention can be expanded.

When the condition expressed by: D2>D1, where D1 is the distance between the first and the second optical system along an optional light beam and d2 is the distance between the second optical system and the conjugate plane B along the same light beam, is satisfied, excessive increase in the sizes of the optical elements of the second optical system can be prevented, whereby practical problems in the optical system relating to the size of the imaging optical system, and the mass-productivity and costs of the elements can be solved.

The converging function of the part around the reference axis of the first optical system, and the diverging function of the part around the reference axis of the second optical system, in combination with some other conditions, are effective in avoiding the enlargement of the imaging optical system and are conditions for realizing an oblique-incidence imaging optical system of comparatively simple construction having a large field angle. This imaging optical system is advantageous when applied to a projector or the like that needs a long back focal length.

When the distance L11 relating to a light beam emerging from a position the nearest to the reference axis of the first optical axis among the distances L1 to a convergence point at the longest distance along the reference axis of the first optical system in sections including principal rays of an optional light beam emerging from the first optical system, and the distance L21 relating to the light beam emerging from the position the nearest to the reference axis of the first optical system among the distances L2 to a convergence point at the shortest distance along the reference axis of the first system meet the following conditions:

$$S1 \leq L11 \leq S1+S2$$

$$S1 \leq L21 \leq S1+S2$$

the diverging function of the second optical system on the side of the reference axis is balanced and, in combination with conditions relating light beams apart from the reference axis, an oblique-incidence imaging optical system is realizable. The aforesaid two conditions relate to the light beam the nearest to the reference axis of the first optical system and signifies that converging points in all the sections of the light beam lie between the second optical system and the conjugate plane b.

The distance L1n relating to a light beam emerging from a position the remotest from the reference axis of the first optical system among the distances L1 to the converging point at the greatest distance along the reference axis of the first optical system meets the following condition.

$$L11/L1n < 0.25$$

This condition must be met to match the condition of the optical system for aberration correction at a position distant from the reference axis of the second optical system, and this is done by making the distance L1 to the converging point of the light beam different between the light beam near the reference axis of the first optical system and the light beam far the reference axis of the first optical system. Although the distances L1 and L2 are measured along the reference axis of the first optical system, when the convergent light beam in the section of the light beam becomes divergent and an imaginary converging point lies on the opposite side of the first optical system (the distance is negative), the distances L1 and L2 are handled as a converging point (distance) further than infinity. Thus, a conditional expression can be obtained without contradiction.

The imaging optical system of the present invention must basically meet a condition:

$$|L21/L2n| < 1.5$$

where L21 is the distance relating to a light beam emerging from a position the nearest to the reference axis of the first optical system among the distances L2, and L2n is the distance L2 relating to a light beam emerging from a position the remotest from the reference axis of the first optical system among the distances L2.

The background of the basic idea relating the foregoing conditions will be explained prior to the description of other conditions.

An optical system for a practical oblique-incidence imaging optical system must be small and simple in construction. When combining the diverging first optical system and the converging second optical system in the vicinity of the reference axis as the basic construction according to the present invention, it is important to miniaturize and simplify the diverging second optical system. Although the respective functions of the first and the second optical system cannot be completely separated, the principal function of the second optical system is to distribute the light beams at desired positions on the conjugate plane B. When simplifying the second optical system, most of the degree of freedom of the second optical system is used for this purpose. Accordingly, the principal function of the first optical system is to match the imaging condition for the light beam that cannot be matched by the second optical system, and angular condition and to maintain the balance of the entire optical system. As mentioned above, the conditions conflicting with each other can be satisfied and a desired oblique-incidence imaging optical system can be realized by simultaneously satisfying the four conditions relating to the converging position of the light beam in addition to the basic constructional conditions.

The three following conditions are favorable for forming an imaging optical system which projects an image obliquely on a screen at a very large angle of incidence.

$$S1/L11 > 0.6$$

$$(S1+S2)/L2n < 1$$

$$\Delta SL > 0.6$$

These conditions are important for realizing a projector that projects an image on a screen from a position very close to the screen, and a very thin rear projection display. Desirably, these projectors meet at least one of the three conditions.

The imaging optical system of the present invention can be used as an enlarging optical system which uses the conjugate plane A as an object plane and forms an enlarged image of the conjugate plane A on the conjugate plane B. An optical system of the same configuration can be used as a reducing optical system which forms a reduced image of the conjugate plane B on the conjugate plane A.

The employment of an optical element having at least one aspherical or free-form surface in the optical system increases the degrees of freedom of design, is an essential condition for realizing the function of each optical system, and satisfies required specifications by the simplest possible construction. It is more effective that both the first and the second optical system are provided with such optical elements.

It is important to avoiding problems relating to the fabrication of the reflecting systems and to providing a realizable oblique-incidence imaging optical system that the first optical system comprises mainly a plurality of refracting optical elements, and the second optical system comprises mainly reflecting optical elements. The optical system can be simplified and the cost of the same can be reduce when the second optical system comprises a single reflecting optical element.

Although the formation of both the first and the second optical system mainly of reflecting optical elements makes the mass production of the oblique-incidence imaging optical system difficult, the use of reflecting optical elements as principal components enables the realization of a very thin oblique-incidence imaging optical system capable of displaying a brighter image by applying the basic conditions of the present invention. The use of reflecting optical elements in combination with techniques for fabricating reflecting optical elements is a prospective future technique.

The degree of freedom of design of the entire optical system can be increased by providing at least one of the conjugate plane A, the first optical system, the second optical system and the conjugate plane B of the optical system and the component optical elements of those components with a degree of freedom of decentering.

If at least either the first optical system or the second optical system can be constituted of rotationally symmetric optical elements, the conventional manufacturing method and assembling method can be used and hence the manufacturing costs can be reduced and ease of assembling the optical system can be greatly improved. If all the rotationally symmetric optical elements have a common axis of rotation symmetry, and the common axis of rotation symmetry coincides with the reference axes of the optical systems, further effects can be expected.

Problems in applying the optical system to practical uses in a specific field can be solved by projecting all the light beams on the conjugate plane B at an angle not smaller than a predetermined angle to a normal to the conjugate plane B. For example, problems in the screen of a reverse projector and problems in a space in which a projector is to be installed can be solved.

BRIEF DESCRIPTION OF THE DRAWINGS

FIG. 15 is a diagrammatic view showing the convergence of light beams emerging from a first optical system included in the rear projection display in the fifth embodiment;

FIG. 16 is a sectional view of the first optical system and a second optical system included in the rear projection display in the fifth embodiment;

FIG. 17 is a sectional view of a rear projection display, i.e., an oblique-incidence imaging optical system, in a sixth embodiment according to the present invention;

FIG. 18 is a front elevation of the rear projection display in the sixth embodiment;

FIG. 21 is a sectional view of a first optical system included in the projector in the seventh embodiment;

FIG. 22 is a sectional view of a rear projection display in an eighth embodiment according to the present invention;

BEST MODE FOR CARRYING OUT THE INVENTION

Preferred embodiments of the present invention will be described with reference to the accompanying drawings.

The present invention can be embodied in various things in many different fields and it needless to describe all the embodiment of the present invention. The invention will be described in terms of a projector for forming an enlarged image of an image-forming device 2 included in a conjugate plane A on a screen 4 included in a conjugate plane B. Although the projector needs an illuminating system, only an imaging optical system and the associated systems will be described because the illuminating system is not essential to the present invention. The accompanying drawings show only parts, devices and systems necessary for the description of the present invention and others unnecessary for the description are omitted.

Each of a first to a seventh embodiment has a first and a second optical system each comprising optical elements having a common axis of rotation symmetry. In those embodiments, the respective reference axes of the first and the second optical system are aligned with a common axis, i.e., an optical axis. Similarly, the image-forming device 2 and the screen 4 are perpendicular to the optical axis and are parallel to each other. Each of an eighth and a ninth embodiment employs a decentered system and a free-form surface, i.e., a rotationally asymmetric system. Effect of increase in the degree of freedom of design will be confirmed through the examination of the eighth and the ninth embodiment.

Figure 1:
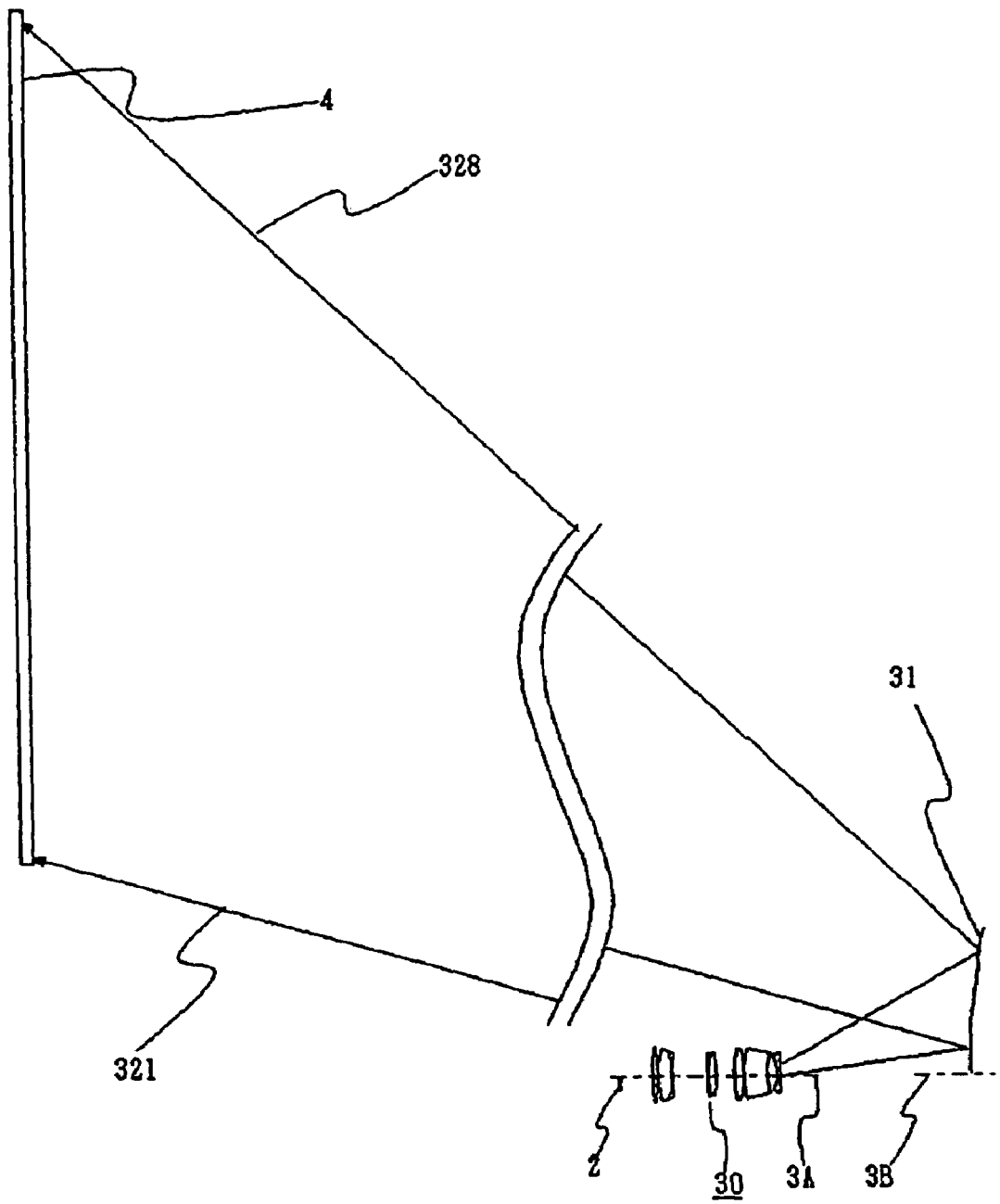
FIG. 1 is a sectional view of a projector, i.e., an oblique-incidence imaging optical system, in a first embodiment according to the present invention.

FIG. 1 is a sectional view of a projector in a first embodiment according to the present invention.

An image-forming device 2 is included in a conjugate plane A. The image-forming device 2 is a transmission liquid crystal display having a diagonal length of 0.7 in. and an aspect ratio of 4:3. An illuminating unit, not shown, for illuminating the image-forming device 2 is disposed on the left side of the image-forming device 2. Light beams emerging from the image-forming device 2 travel through a first optical system 30 comprising refracting optical elements, are reflected by a reflecting mirror included in a second optical system 31 to form an enlarged image of 100 in. on a screen 4 included in a conjugate plane B.

The first optical system 30 and the second optical system 31 have reference axes 3A and 3B, respectively. The first optical system 30 converges parallel light beams coming from an object point at infinity in the vicinity of its reference axis 3A, and the second optical system 31 diverges the light beams in the vicinity of its reference axis 3B. The image-forming device 2 is disposed below the reference axis 3A of the first optical system 30, as viewed in FIG. 1. A light beam 321 traveled through a point the nearest to the reference axis 3A of the first optical system 30 falls on a lower part of the screen 4. A light beam 328 traveled through a point the remotest from the reference axis 3A falls on an upper part of the screen 4. The distance S2 between the second optical system 31 and the screen 4 along the reference axis 3B is 2 m. An imaging optical system including the optical systems 30 and 31 is disposed on a level below the screen 4 and projects an image obliquely upward onto the screen 4. Thus, the imaging optical system is a front projection display that projects an image on the screen from the front side of the screen.

Figure 2:
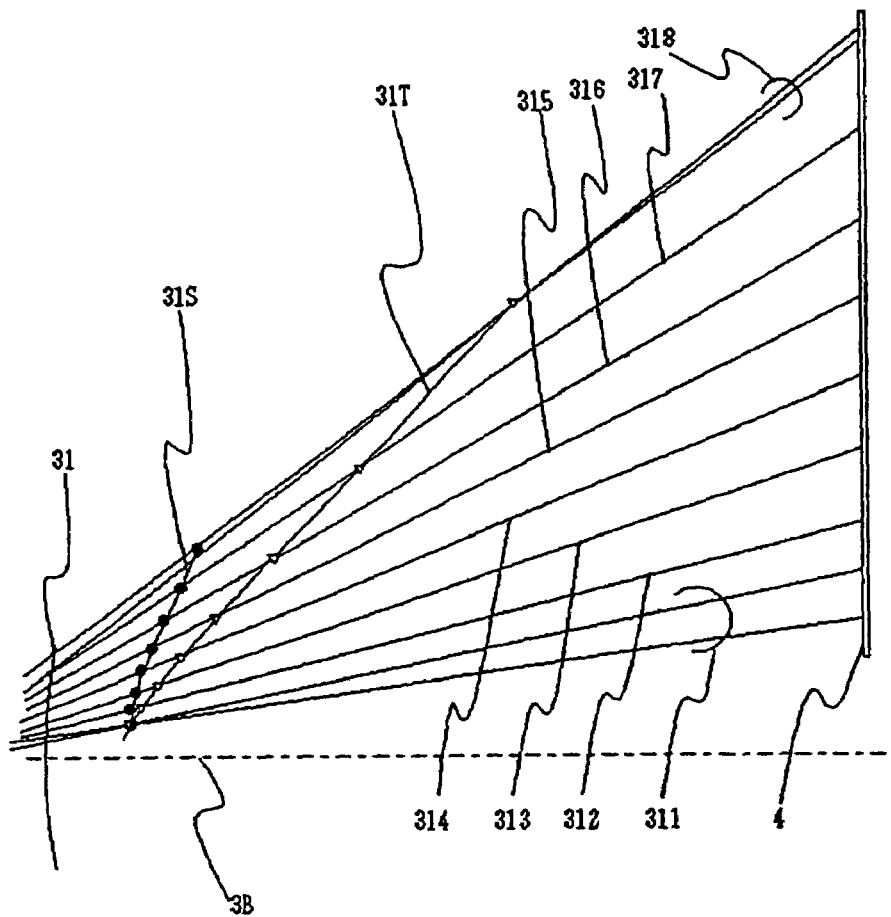
FIG. 2 is a diagrammatic view showing the convergence of light beams emerging from a first optical system included in the projector in the first embodiment.

FIG. 2 shows the light beams 311 to 318 traveled through the first optical system 30 and not acted upon by the second optical system 31. The light beams shown in FIG. 2 are supposed to have penetrated the second optical system 31 without being reflected by the reflecting mirror of the second optical system 31. The distance between the screen 4 and the second optical system 31 along the reference axis 3B is 2 m. The light beams farther from the reference axis 3B in FIG. 2 are those farther from the reference axis 3A. In FIG. 2, points marked with a blank triangle (Δ) are converging points of the light beams in the paper where the diameters of the sections of the light beams are smallest, and points marked with a solid circle (●) are converging points in a section perpendicular to the paper. A curve 31T connects the converging points marked with a blank triangle, and a curve 31S connects the converging points marked with a solid circle. Each converging point marked with a solid circle is the distance to the nearest converging point along the reference axis 3A of the first optical system 30 among all the sections of the light beam. Similarly, each converging point marked with a blank triangle corresponds to the longest converging point.

It is understood from FIG. 2 that the converging point marked with a blank triangle of a light beam in the paper traveled through the first optical system 30 is farther from the first optical system 30, and the angle of convergence at the converging point decreases gradually when the light beam emerges from a part of the first optical system father from the reference axis 3A. The distance of the converging point marked with a solid circle in a section perpendicular to it does not change greatly. In this description, the term, "converging angle" signifies a maximum cone angle at the converging point in the section of the light beam. With a divergent pencil of rays diverging after the first optical system 30, converging angle is a negative maximum cone angle. Even in the case that a light beam converges gradually and after that the light beam starts diverging, it can be said that converging angle unitarily decreases.

In a practical optical system, the screen 4 extends into the paper and light beams travel and fall on the two-dimensional surface of the screen 4. If all the light beams are shown in FIG. 2, the drawing will be very complicated and hence all the light beams are not shown intentionally. Regarding those, numerical data is tabulated together with other embodiments in Table 3 showing conditions for realizing the present invention. In the case of this example, all the converging points relating to optional light beams having principal rays in the paper are formed between the second optical system 31 and the screen 4 included in the conjugate plane B. As shown in table 3, light beams not extending in the paper, traveling toward the diagonal of the screen 4, and separated from the reference axis have converging points at positions beyond the screen 4.

Figure 3:
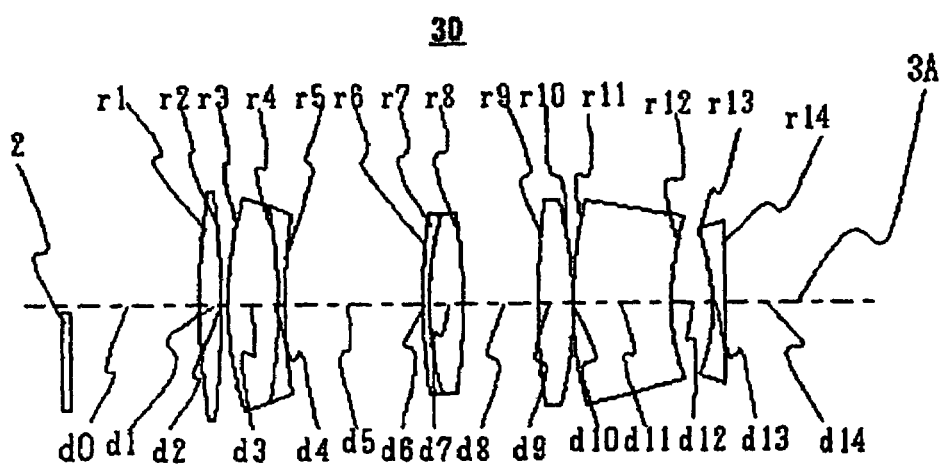
FIG. 3 is a sectional view of the first optical system of the projector in the first embodiment.

FIG. 3 is a sectional view of the first optical system 30. The first optical system 30 comprises six groups of eight refracting optical elements. All the surfaces have rotationally symmetric shapes having axis of symmetry coinciding with the reference axis 3A. In a general optical system including a decentered system, such correspondence does not hold good. In such a case, an optional reference axis may be selected; a most rational or convenient axis may be used as a reference axis. Light beams emerging from the image-forming device 2 travel sequentially across refracting surfaces r1, r2, . . . , and r14 in that order to the second optical system 31. The distance of travel of the light beams from the first optical system 310 along the reference axis of the first optical system 30 is measured along the reference axis 3A from the apex of the surface r14. Since the first optical system 30 is a rotationally symmetric system, focal length in an ordinary sense can be defined. In this case, the focal length f=37.1 mm.

Table 1 shows the exit angles of the principal rays of the light beams 311 to 318 after passing through the first optical system 30. In Table 1, the term, "image height" signifies the distance between the reference axis 3A of the first optical system 30 and an exit point from which the corresponding light beam emerges from the image-forming device 2, the term, "actual exit angle" signifies an actual angle between the principal ray of the light beam and the reference axis 3A, and the term, "calculated exit angle" signifies a calculated exit angle θ calculated by using: h=f×tan θ, where h is image height and f is focal length. It is known from Table 1 that the difference between the actual exit angle and the calculated exit angle of the light beam farther from the reference axis 3A is greater than that of the light beam nearer to the reference axis 3A. The calculated exit angle and the actual exit angle of the light beam near the reference axis 3A are scarcely different.

TABLE 1

| Light beam number | Image height | Actual exit angle | Calculated exit angle |
| --- | --- | --- | --- |
| 311 | 3.50 | 5.41 | 5.39 |
| 312 | 5.00 | 7.74 | 7.67 |
| 313 | 6.50 | 10.09 | 9.93 |
| 314 | 8.00 | 12.45 | 12.16 |
| 315 | 9.50 | 14.83 | 14.36 |
| 316 | 11.00 | 17.25 | 16.51 |
| 317 | 12.50 | 19.70 | 18.61 |
| 318 | 14.17 | 22.48 | 20.89 |

The reflecting mirror 31 included in the second optical system 31 shown in FIG. 1 is a rotationally symmetric aspheric mirror having an axis of rotation coinciding with the reference axis 3B. Thus, the optical axis coincides with the reference axis 3B. A part of the reflecting mirror around the reference axis 3B is a convex surface having a radius of curvature of about 400 mm and capable of diverging the incident light beams. The focal length f of the same part of the reflecting mirror is −200 mm.

In this embodiment, the optical systems 30 and 31 are disposed such that the respective reference axes thereof are aligned and hence the optical systems 30 and 31 have a common optical axis. The focal length f of a part around the optical axis of a composite system including the optical systems 30 and 31 is 14.7 mm. Table 2 shows calculated exit angles of the light beams after being reflected by the second optical system 31 calculated on the basis of angles between the light beams and the optical axis and the focal length of the composite system. Although slightly different, the actual and calculated exit angles agree closely with each other. A TV distortion caused by this embodiment is 0.5% or below.

TABLE 2

| Light beam number | Image height | Actual exit angle | Calculated exit angle |
| --- | --- | --- | --- |
| 311 | 3.50 | 13.38 | 13.39 |
| 312 | 5.00 | 18.75 | 18.78 |
| 313 | 6.50 | 23.77 | 23.84 |
| 314 | 8.00 | 28.39 | 28.54 |
| 315 | 9.50 | 32.58 | 32.86 |
| 316 | 11.00 | 36.36 | 36.79 |

TABLE 2-continued

| Light beam number | Image height | Actual exit angle | Calculated exit angle |
| --- | --- | --- | --- |
| 317 | 12.50 | 39.79 | 40.36 |
| 318 | 14.17 | 43.24 | 43.93 |

The distance S1 along the common optical axis between the first optical system 30 and the second optical system 31 is 280 mm, and the distance S2 between the second optical system 31 and the screen 4 is 2000 mm. Thus, it is obvious that the distance D1 along an optional light beam between the first optical system 30 and the second optical system 31, and the distance D2 along the same light beam between the second optical system 31 and the screen 4 meets an inequality: D2>D1. The first optical system 30 receives a light beam having a cone angle of 23° (f number of 2.5) from an optional point on the image-forming device 2 and secures sufficient brightness for a projecting system. The image-forming device 2 and the screen 4 are parallel to each other and the common optical axis aligned with the reference axes 3A and 3B is a normal to both the image-forming device 2 and the screen 4.

Necessary conditions for the imaging optical system according to the present invention will be examined hereinafter.

TABLE 3

| Embodiment | S1 | S2 | Image height | L1 | φ2 | L2 | φ1 |
| --- | --- | --- | --- | --- | --- | --- | --- |
| Embodiment 1 | 280 | 2000 | 1 | 490.2 | 0.0 | 475.1 | 90.0 |
| | | | n | 2594.1 | 27.0 | 723.0 | 117.0 |
| Embodiment 2 | 300 | 700 | 1 | 517.3 | 0.0 | 479.8 | 90.0 |
| | | | n | 7433.2 | 24.0 | 440.8 | 114.0 |
| Embodiment 3 | 300 | 450 | 1 | 432.2 | 0.0 | 409.4 | 90.0 |
| | | | n | −1750.3 | 27.0 | 790.0 | 117.0 |
| Embodiment 4 | 300 | 700 | 1 | 412.9 | 0.0 | 403.8 | 90.0 |
| | | | n | −734.1 | 12.0 | 987.5 | 102.0 |
| Embodiment 5 | 230 | 520 | 1 | 404.9 | 0.0 | 359.0 | 90.0 |
| | | | n | −495.0 | 24.0 | 736.1 | 114.0 |
| Embodiment 6 | 280 | 750 | 1 | 421.9 | 0.0 | 392.3 | 90.0 |
| | | | n | −373.7 | 26.0 | 940.3 | 117.0 |
| Embodiment 7 | 300 | 167 | 1 | 454.1 | 0.0 | 368.4 | 90.0 |
| | | | n | −430.9 | 0.0 | 716.7 | 117.0 |
| Embodiment 8 | 97 | 257 | 1 | 154.9 | 0.0 | 141.3 | 90.0 |
| | | | n | −112.6 | 26.0 | 409.4 | 115.5 |
| Embodiment 9 | 80 | 205 | 1 | 109.8 | 0.0 | 106.5 | 90.0 |
| | | | n | −132.0 | 40.0 | 342.9 | 117.0 |

Table 3 shows converging positions where light beams converge in embodiments including those which will be described later. Shown in Table 3 are distance S1 along the reference axis of the first optical system between the first and the second optical system, distance S2 along the reference axis of the second optical system between the second optical axis and the conjugate plane B, distance L1 to a converging point in a section of a light beam that makes distance along the reference axis of the first optical system longest, and distance L2 to a converging point in another section of a light beam that makes distance along the reference axis of the first optical system shortest. Only the values of L1 and L2 for L11 and L12 (lines in which the image height is 1) emerging from a part the nearest to the reference axis of the first optical system and L1n and L2n (lines in which the image height is n) relating to a light beam emerging from a point the remotest from the reference axis of the first optical system are shown. Shown in addition to data necessary for calculation using conditional expressions is light beam section angle immediately after emergency from the conjugate plane A as reference for light beam section angles at the converging points L1 and L2. The shape of the wavefront of the light beam changes as the light beam is subjected repeatedly to reflection and refraction and hence the light beam section angle is only a tentative standard.

TABLE 4

| Embodiment | S1/L11 | S1/L1n | ΔSL | (S1 + S2)/L11 | S1/L21 | (S1 + S2)/L21 | (S1 + S2)/L2n | L11/L1n | L21/L2n |
|---|---|---|---|---|---|---|---|---|---|
| 1 | 0.57 | 0.11 | 0.46 | 4.65 | 0.59 | 4.80 | 3.15 | 0.19 | 0.66 |
| 2 | 0.58 | 0.04 | 0.54 | 1.93 | 0.63 | 2.08 | 2.27 | 0.07 | 1.09 |
| 3 | 0.69 | −0.17 | 0.87 | 1.74 | 0.73 | 1.83 | 0.95 | −0.25 | 0.52 |
| 4 | 0.73 | −0.41 | 1.14 | 2.42 | 0.74 | 2.48 | 1.01 | −0.56 | 0.41 |
| 5 | 0.57 | −0.46 | 1.03 | 1.85 | 0.64 | 2.09 | 1.02 | −0.82 | 0.49 |
| 6 | 0.66 | −0.75 | 1.41 | 2.44 | 0.71 | 2.63 | 1.10 | −1.13 | 0.42 |
| 7 | 0.66 | −0.70 | 1.36 | 1.03 | 0.81 | 1.27 | 0.65 | −1.05 | 0.51 |
| 8 | 0.63 | −0.80 | 1.49 | 2.29 | 0.69 | 2.51 | 0.87 | −1.38 | 0.35 |
| 9 | 0.73 | −0.61 | 1.34 | 2.60 | 0.75 | 2.68 | 0.83 | −0.83 | 0.31 |

Table 4 shows values calculated on the basis of data shown in Table 3 to confirm conditional expressions for the embodiments. For example, a conditional expression: $S1 \leq L11 \leq S1+S2$ can be confirmed from a fact shown in Table 4 that $S1/L11 < 1$ and $(S1+S2)/L11 > 1$. The same holds true for other conditional expressions. The basic explanation of the first embodiment will be now ended. A desired oblique-incidence imaging optical system of comparatively simple construction can be realized by determining the basic construction of the first and the second optical system and controlling the converging positions of the light beam. The basic idea is the use of the first optical system as a matching system for light beam relating to the second optical system.

Figure 4:
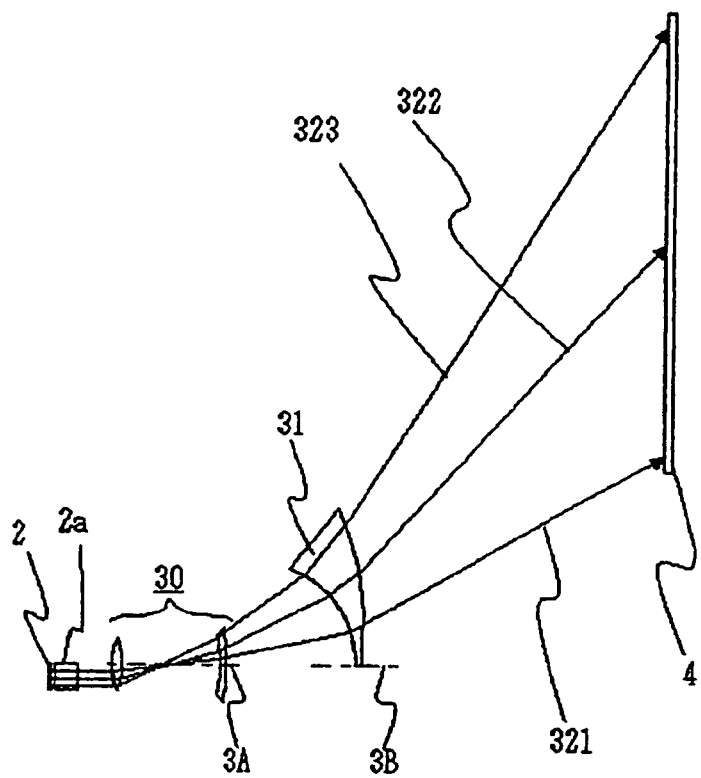
FIG. 4 is a sectional view of a projector, i.e., an oblique-incidence imaging optical system, in a second embodiment according to the present invention.

FIG. 4 shows a projector in a second embodiment according to the present invention. An image-forming device 2 included in a conjugate plane A is a 1.3 in. transmission display. A 50 in. enlarged image is formed on a screen 4 included in a conjugate plane B. Only principal matters different from those of the first embodiment will be described. A first optical system 30 having a reference axis 3A includes two refracting optical elements. The refracting optical element having a positive power is disposed on the side of the image-forming device 2, and the refracting optical element having a negative power is disposed on the side of a second optical system 31. The second optical system 31 having a reference axis 3B includes a single refracting optical element 31. Basically, the second embodiment is analogous with the first embodiment, except that the second optical system 31 of the second embodiment comprises the refracting optical element.

Figure 5:
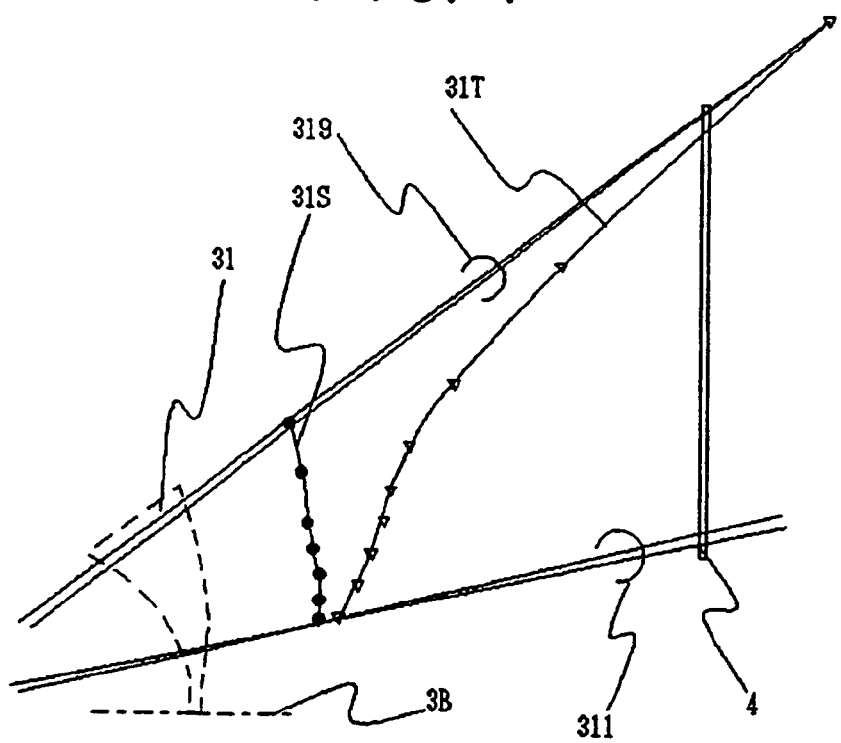
FIG. 5 is a diagrammatic view showing the convergence of light beams emerging from a first optical system included in the projector in the second embodiment.

FIG. 5 showing a mode of the convergence of light beams, corresponding to that shown in FIG. 2 relating to the first embodiment. The respective meanings of marks are the same as those of the corresponding marks shown in FIG. 2. Actually, there are light beams arranged in a direction into the paper including those traveling toward the opposite angles of the screen 4 similar to those mentioned in connection with FIG. 2.

The positions of converging points shown in FIG. 5 are similar to those shown in FIG. 2, except that a converging point marked with a blank triangle (Δ) where a light beam 319 the farthest from the reference axis 3A converges is located behind the screen 4. Converging points marked with a blank triangle in the paper are on a curve 31T. The converging points of light beams farther along the optical axis 3A of the first optical system 30 are farther from the optical axis 3A, and converging angle decreases gradually. Converging points marked with a solid circle (●) in a section perpendicular to the paper are on a curve 31S and are nearer to the first optical system 30. As obvious from FIG. 5 and Table 3, the converging points marked with a solid circle of light beams farther from the reference axis 3A are closer to the first optical system. The distance S2 along the reference axis 3B between the second optical system 31 and the screen 4 is 700 mm, and the distance s1 along the reference axis 3A between the first optical system 30 and the second optical system 31 is 300 mm. The cone angle of the light beam received by the first optical system 30 from the image-forming device 2 is 10° (f number of about 5.6). The first optical system 30 has a focal length f=61.3 mm. A composite optical system consisting of the first optical system 30 and the second optical system 31 has a focal length f=15.7 mm. Exit angles of light beams emerging from the first optical system 30, and calculated exit angles calculated on the basis of the focal length are shown in Table 5.

TABLE 5

| Light beam number | Image height | Actual exit angle | Calculated Exit angle |
|---|---|---|---|
| 311 | 10.00 | 9.46 | 9.27 |
| 312 | 12.50 | 11.90 | 11.53 |
| 313 | 15.00 | 14.38 | 13.76 |
| 314 | 17.50 | 16.91 | 15.95 |
| 315 | 20.00 | 19.49 | 18.08 |
| 316 | 22.50 | 22.12 | 20.17 |
| 317 | 25.00 | 24.81 | 22.20 |
| 318 | 27.50 | 27.58 | 24.18 |
| 319 | 29.81 | 30.24 | 25.95 |

As shown in Table 5, the actual exit angles are greater than the corresponding calculated exit angles, respectively. Table 6 shows actual exit angles of light beams emerging from the second optical system and calculated exit angles calculated on the basis of the focal length of the composite optical system.

TABLE 6

| Light beam number | Image height | Actual exit angle | Calculated Exit angle |
|---|---|---|---|
| 311 | 10.00 | 24.13 | 32.52 |
| 312 | 12.50 | 29.17 | 38.55 |
| 313 | 15.00 | 33.59 | 43.72 |
| 314 | 17.50 | 37.42 | 48.13 |
| 315 | 20.00 | 40.75 | 51.89 |
| 316 | 22.50 | 43.66 | 55.12 |

TABLE 6-continued

| Light beam number | Image height | Actual exit angle | Calculated Exit angle |
|---|---|---|---|
| 317 | 25.00 | 46.21 | 57.89 |
| 318 | 27.50 | 48.47 | 60.30 |
| 319 | 29.81 | 50.33 | 62.25 |

The differences between the actual exit angles and the corresponding calculated exit angles, differing from those in the first embodiment, are large, which suggests the insignificance of paraxial focal length. Despite this fact, the distortion of an image formed in the screen 4 is 0.16% or below. It is to be noted that the exit angles with respect to the reference axis 3A of the first optical system shown in Table 5 are greatly different from those with respect to the reference axis 3B of the second optical system shown Table 8, which indicates that the effect of the second optical system in increasing the exit angle is significant. Although the ratio of increase in exit angle in this embodiment is comparative small as compared with those in other embodiments, the ratio between the tangents of exit angles of the light beam 319, i.e., the ratio between the values of tan θ, is greater than two.

Figure 6:
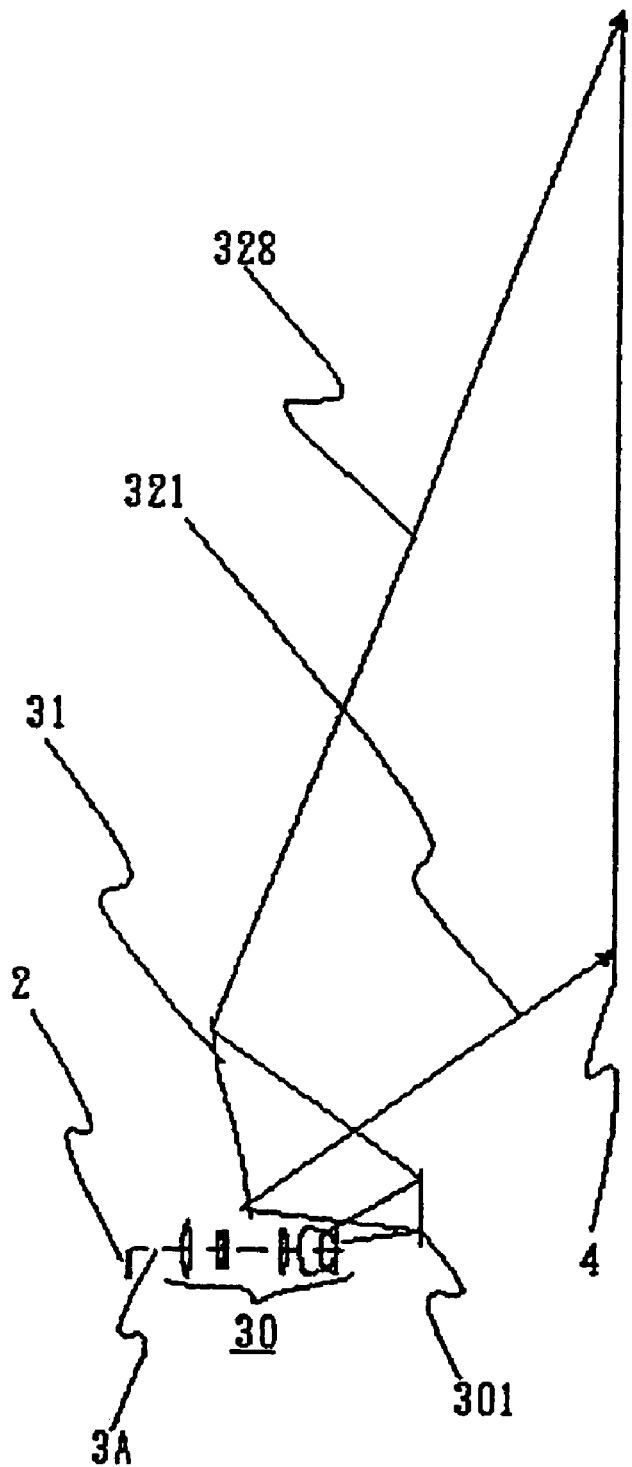
FIG. 6 is a sectional view of a projector, i.e., an oblique-incidence imaging optical system, in a third embodiment according to the present invention.

FIG. 6 is a sectional view of a projector in a third embodiment according to the present invention. An image-forming device 2 is a 0.9 in. reflection display. A 60 in. enlarged image of an image formed by the image-forming device 2 is formed on a screen 4 by a first optical system 30 including refracting optical elements, and a second optical system 31 including a single reflecting mirror. The optical axis of the projector is folded by a plane mirror 301 disposed between the second optical system 31 and the screen 4. The projector, similarly to the first and the second embodiment, projects light beams upward from a position on a level below the center of the screen 4. The third embodiment is a typical example of application of an oblique-incidence imaging optical system according to the present invention to a projector. The projector is simple in construction and has a satisfactory ability as a projecting system. The distance S2 between the second optical system 31 and the screen 4 is 450 mm. The cone angle of light beams received by the first optical system from the image-forming device 2 is 14.4° (f number of 4). In a section shown in FIG. 6, the angle between a light beam 328 extending at the largest field angle and the reference axis 3A is 63° (the maximum angle among those between all the light beams not included in the paper and the reference axis 3A is 64.7°). Although the field angle is thus very large, distortion is as small as 0.03%. The difference between the distance D1 along a light beam 321 between the first optical system 30 and the second optical system 31 and the distance D2 along the same light beam 321 between the second optical system 31 and the screen 4 is the smallest. The distance D1=298.2 and the distance D2=520.7, which meets the condition expressed by D2>D1.

Figure 7:
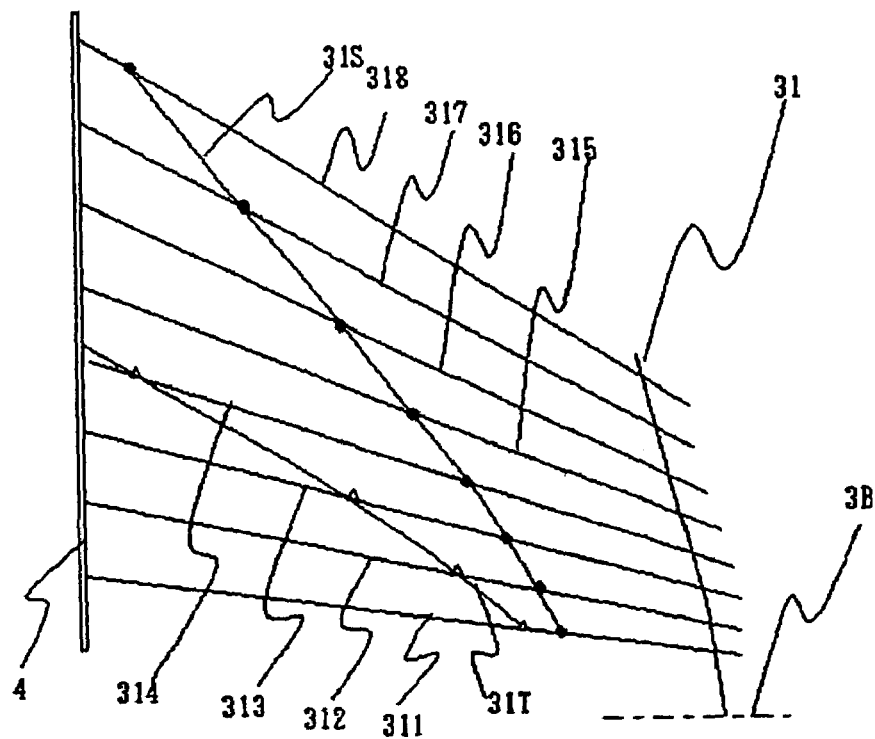
FIG. 7 is a diagrammatic view showing the convergence of light beams emerging from a first optical system included in the projector in the third embodiment.

FIG. 7 shows converging points in light beam sections. The ratio of converging points beyond the screen 4 to the converging points on a curve 31T is larger than those in the foregoing embodiments. A light beam 315 and those on the outer side of the same have their converging points beyond the screen 4. A light beam 318 does not have any converging point and is a substantially parallel beam converging at infinity. In the first and the second embodiment, converging points (Δ) have converging points in the direction of travel of light beams along the reference axis of the first optical system. As obvious from Table 3, in this embodiment, the converging point of a light beam relating to L1n is at a negative distance and the light beam is divergent.

Figure 8:
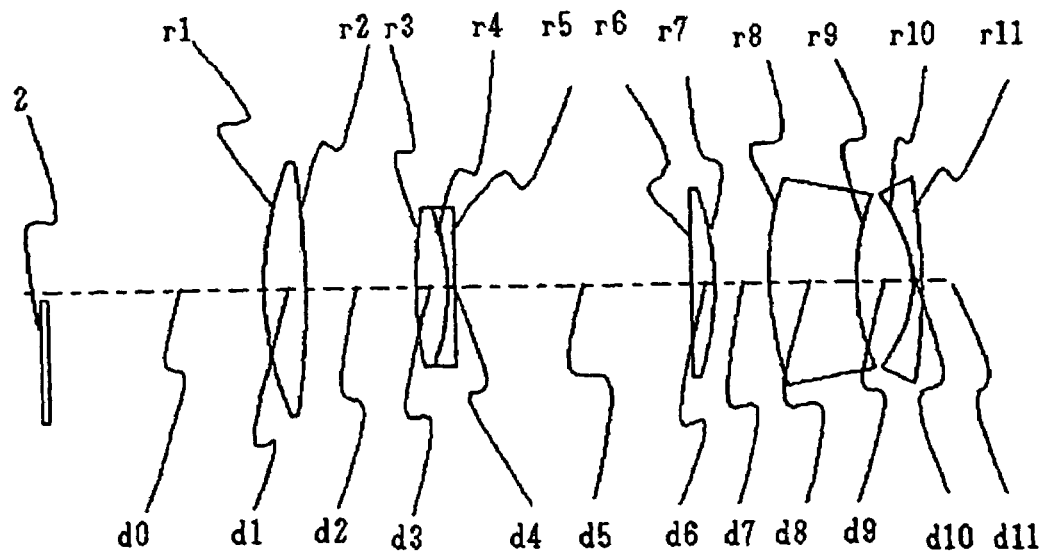
FIG. 8 is a sectional view of the first optical system included in the projector in the third embodiment.

FIG. 8 is a sectional view of the first optical system. In this embodiment, the image-forming device 2 is a reflection liquid crystal display. Generally, a reflection liquid crystal display needs a sufficient back focal distance to secure a space for illuminating light. In this embodiment, a sufficient space is secured between the image-forming device 2 and an optical element of the first optical system 30 the nearest to the image-forming device 2, which is greater than eight times the focal length of the composite optical system. The first optical system has a focal length f1=35.5 mm, the second optical system has a focal length f2=−96 mm and the composite optical system consisting of the first and the second optical system has a focal length f=7.9 mm. Thus, the focal length f of the composite optical system is very small as compared with the respective foci f1 and f2 of the first and the second optical systems.

This embodiment is a first example satisfying the following additional conditions.

$S1/L11 > 0.6$ $(S1+S2)/L2n < 1$ $\Delta SL > 0.6$

Actually, as shown in Table 4, $S1/L11 = 0.69$ $(S1+S2)/L2n = 0.95$ $\Delta SL = 0.87$ Thus, this embodiment satisfies all the foregoing conditions. When light beams fall on the screen at a large angle of incidence as in this embodiment, severer conditions must be satisfied in addition to satisfying the ordinary conditions to balance imaging characteristics. The aforesaid first condition signifies bringing the remotest converging point of a light beam emerging from a part the nearest to the reference axis of the first optical system close to the second optical system. The second condition signifies that alight beam emerging from a part the remotest from the reference axis of the first optical system converges on a converging point lying beyond the conjugate plane B. The last condition relates to the longest converging points of a light beam emerging from a part the nearest to the reference axis of the first optical system and a light beam emerging from a part the remotest from the reference axis of the first optical system and signifies spacing the respective converging points of the light beam emerging from a part the nearest to the reference axis of the first optical system and the light beam emerging from a part the remotest from the reference axis of the first optical system a distance greater than a predetermined distance apart from each other. Desirably, the components of the optical systems for realizing a large oblique angle of incidence have construction and shapes meeting at least one of those conditions. Preferred embodiments which will be described hereinafter meet at least one of the three aforesaid conditions.

Figure 9:
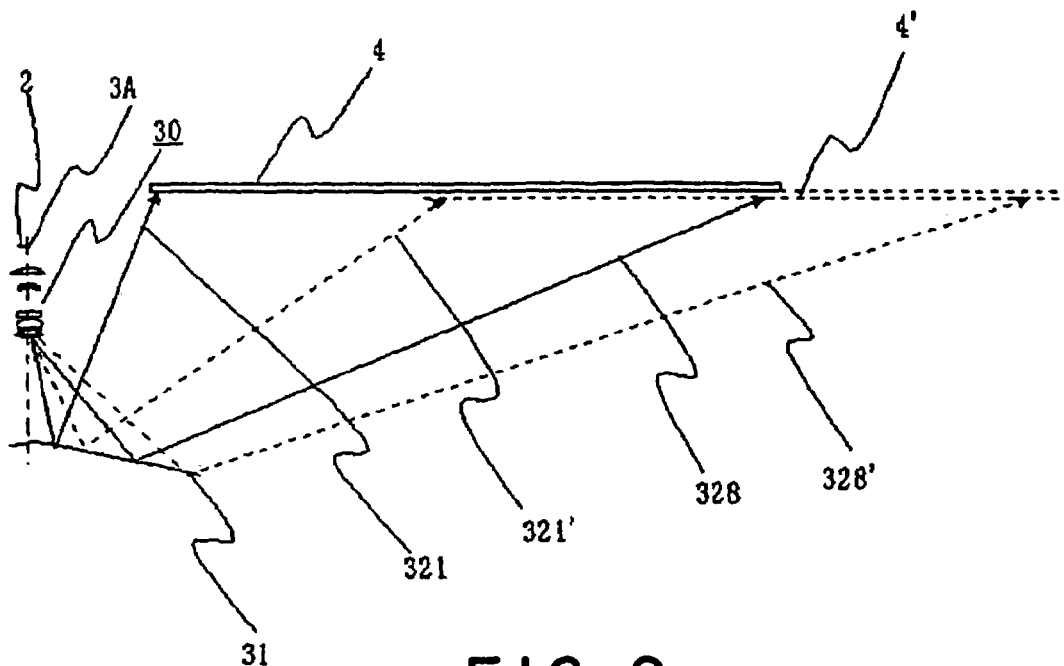
FIG. 9 is a sectional view of a projector, i.e., an oblique-incidence imaging optical system, in a fourth embodiment according to the present invention.
Figure 10:
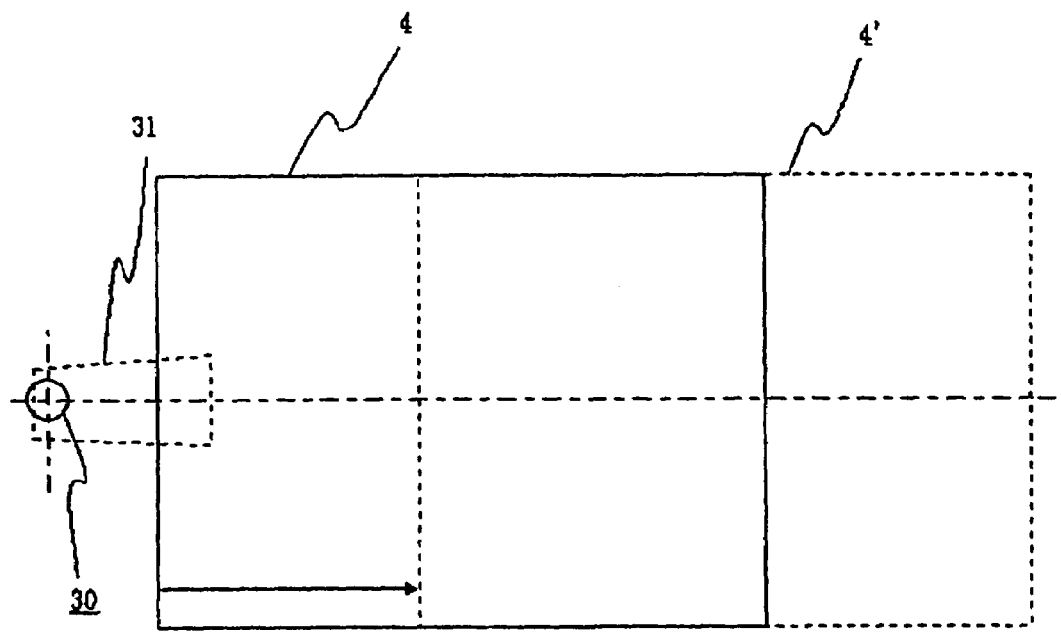
FIG. 10 is a front elevation of the projector in the fourth embodiment.

FIG. 9 is a sectional view of a front projector in a fourth embodiment according to the present invention similar to those in the foregoing embodiments. This front projector differs from the foregoing projectors in that the projector is disposed just beside a screen 4, and the position of an image on the screen 4 can be moved. FIG. 9 is a sectional view taken on a horizontal plane dividing the screen 4 into equal upper and lower halves. FIG. 10 is a front view of the front projector shown in FIG. 9.

An image-forming device 2 is a 0.7 in. reflection image-forming device. Light beams emitted by the image-forming device 2 travel through a first optical system 30 including refracting optical elements and a second optical system 31 including a single reflecting mirror and form a 60 in. image on a screen 4. The image formed on the screen 4 can be moved horizontally. A 60 in. image formed in a region between light beams 321 and 328 can be laterally moved a distance equal to half the width of the screen 4 to a region between light beams 321' and 328', which makes a viewer have an illusion that the screen 4 indicated by continuous lines in FIG. 10 moves to a position indicated by dotted lines 4' in FIG. 10. The projector capable of obliquely projecting an image on the screen through a short distance of projection rarely hinders viewer's viewing the image formed on the screen; a function to move an image horizontally is important for increasing the degree of freedom of installation of the projector.

Figure 11:
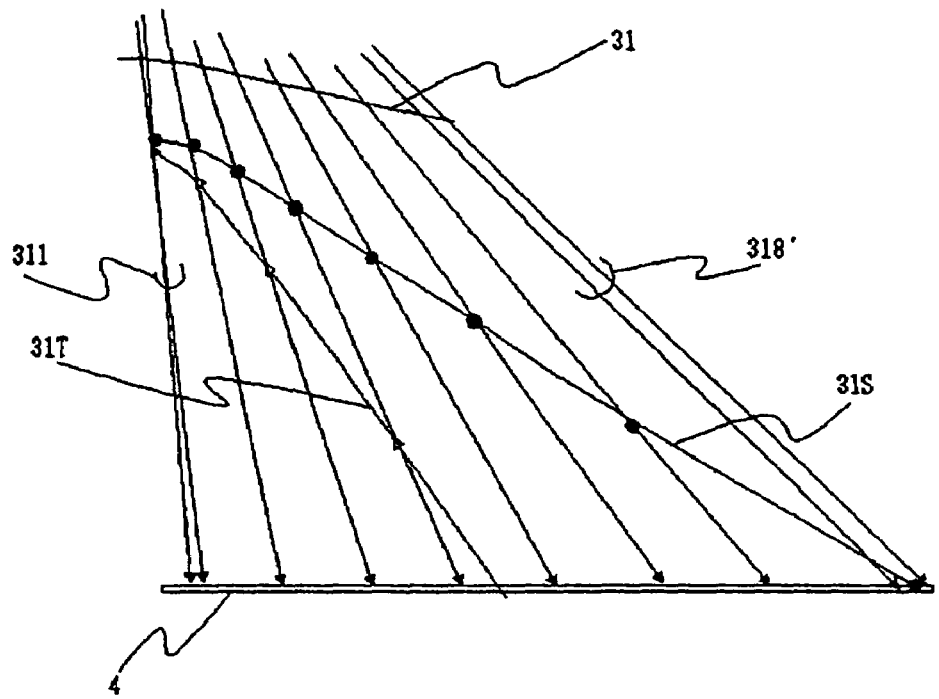
FIG. 11 is a diagrammatic view showing the convergence of light beams emerging from a first optical system included in the projector in the fourth embodiment.
Figure 12:
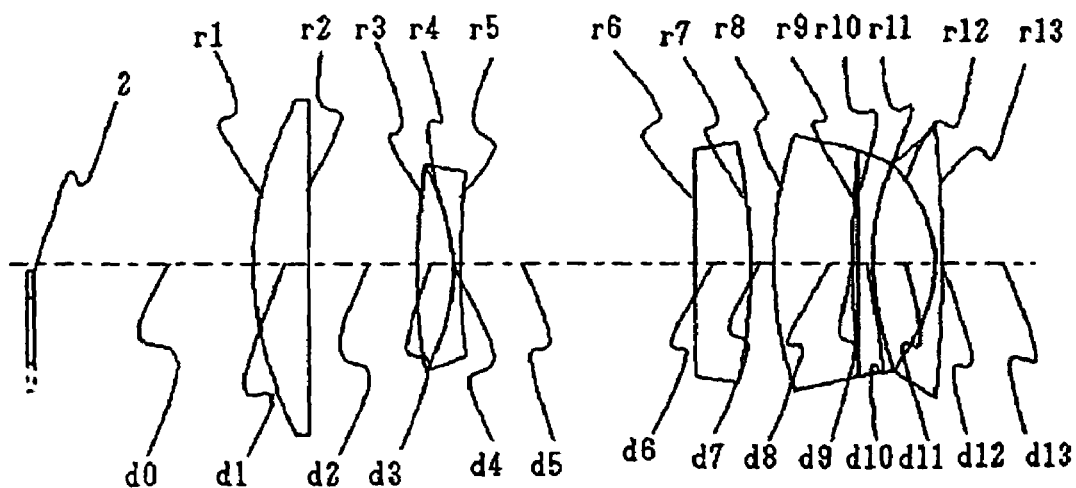
FIG. 12 is a sectional view of the first optical system included in the projector in the fourth embodiment.

FIG. 11 shows the converging points of light beams emerging from the first optical system 30 in the same section as that shown in FIG. 10. Light beams emerging from the first optical system 30 are reflected by the second optical system 31 and converge on the screen 4. In FIG. 11, light beams are not reflected by the second optical system 31 and are traveling through the second optical system 31 toward positions corresponding to those on the screen 4. The distance S2 between the second optical system 31 and the screen 4 is 700 mm. Points marked with a blank triangle (Δ) are converging points on the paper, and points marked with a solid circle (●) are on a light beam section perpendicular to the paper. As obvious from FIG. 11, a light beam emerging from a part of the first optical system 30 farther from the reference axis 3A converges on a converging point farther from the first optical system 30, and a light beam 318' is a divergent light beam that does not converge. The light beams farther from the reference axis 3A have smaller converging angles. The light beam 318' has a negative converging angle. The converging points marked with a solid circle (●) in the section perpendicular to the sheet are nearer to the first optical system 30 than those marked with a blank triangle (Δ). The light beam 318' has a converging point substantially on the screen. The cone angle of the light beams received from the image-forming device 2 by the first optical system 30 is 14.4° (f number of 4) and a maximum distortion is 0.23%. FIG. 12 is a sectional view of the first optical system 30.

Figure 13:
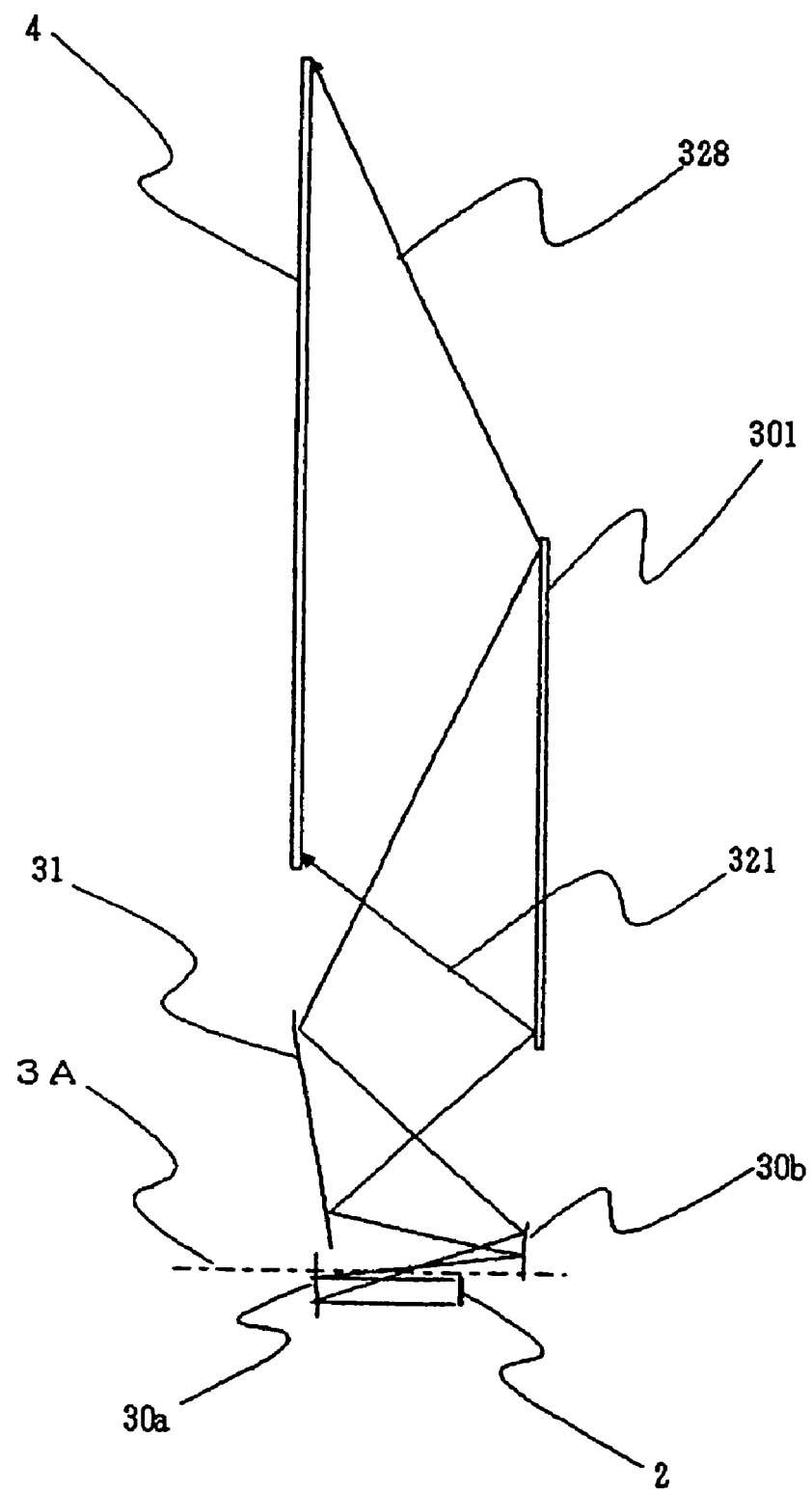
FIG. 13 is a sectional view of a rear projection display, i.e., an oblique-incidence imaging optical system, in a fifth embodiment according to the present invention.

FIG. 13 shows a rear projector in a fifth embodiment according to the present invention. The rear projector projects an image on a screen from behind the screen and a viewer views the image from the front side of the screen similarly to viewing an image on an ordinary television screen.

Figure 14:
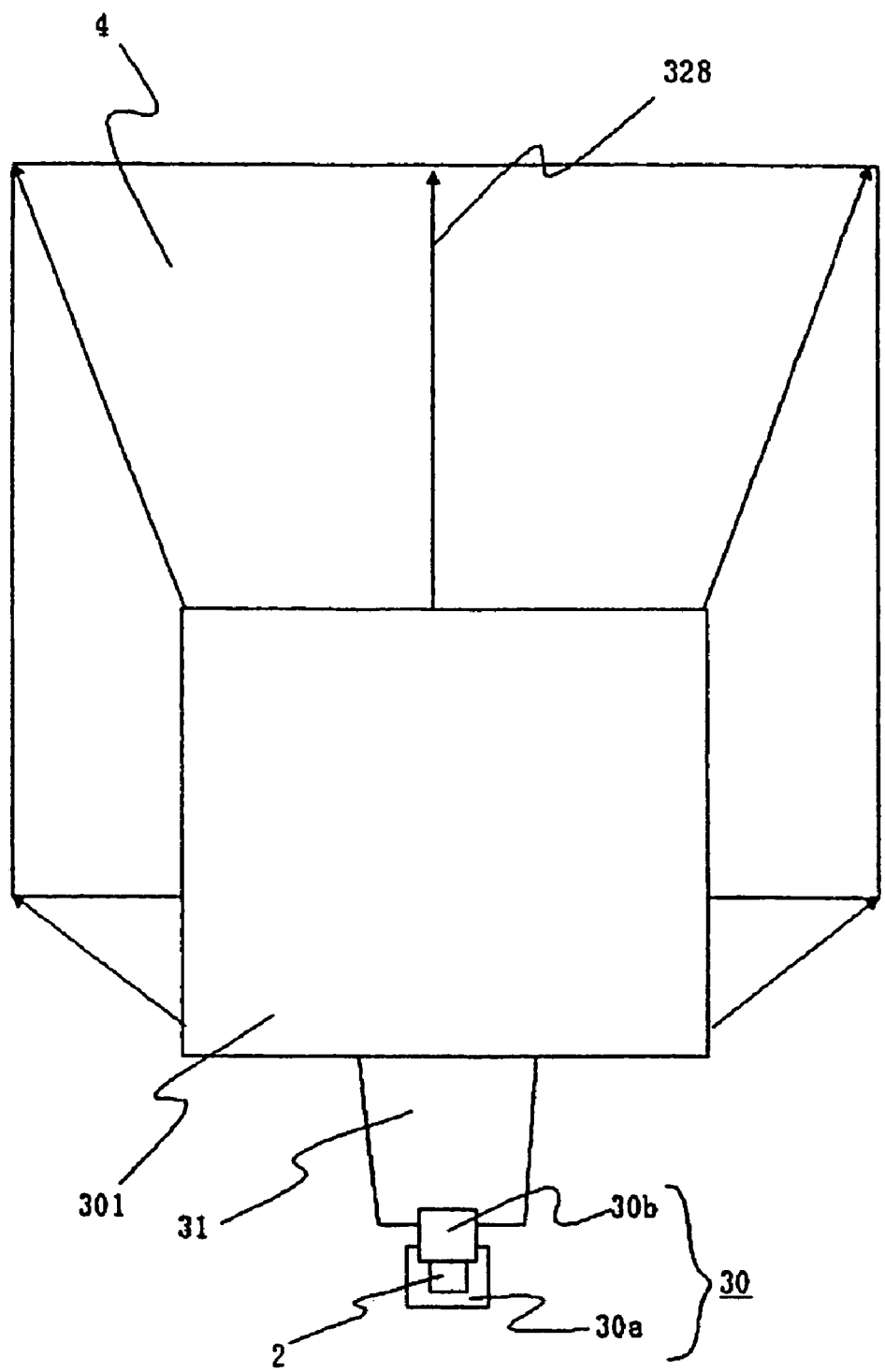
FIG. 14 is a front elevation of the rear projection display in the fifth embodiment.

An image-forming device 2 included in a conjugate plane A is a transmission liquid crystal display. Light beams emitted by the image-forming device 2 are reflected by two reflecting mirrors 30a and 30b included in a first optical system, a single reflecting mirror 31 included in a second optical system, and a plane mirror 301 to form an enlarged image on a screen 4 included in the other conjugate plane B. The image-forming device 2 is provided with a 1.3 in. screen. A 50 in. image is formed on the screen 4. Since the light beams are thus folded back by the plane mirror 301, the rear projector can be formed in a small thickness. The distance between the plane mirror 301 and the screen 4 is 280 mm (S2=520 mm). The thickness of the rear projector is about half that of the corresponding conventional rear projector. FIG. 14 is a rear view of the rear projector. FIG. 15 shows the converging mode of light beams, and FIG. 16 shows an enlarged view of an imaging system. The cone angle of the light beams received by the first optical system 30 from the image-forming device 2 is 11.5° (f number is 5), and a maximum distortion is 0.57%.

FIG. 17 is a sectional view of a rear projector in a sixth embodiment according to the present invention, and the sixth embodiment is related to the rear projector as well as the fifth embodiment and FIG. 17 is a top view of the rear projector of the sixth embodiment.

Figure 19:
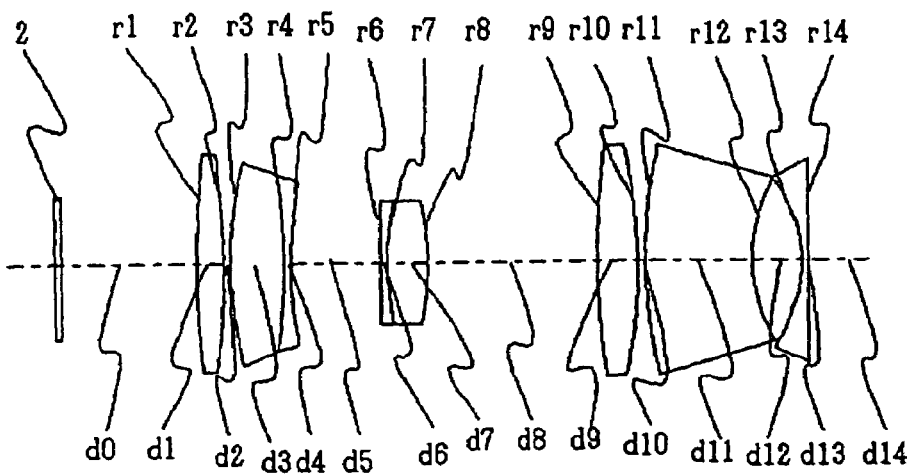
FIG. 19 is a sectional view of a first optical system included in the rear projection display in the sixth embodiment.

Light beams emitted by a 0.7 in. image-forming device 2 travel through a first optical system 30 including refracting optical elements, a plane mirror 301, a second optical system 31 including a single reflecting mirror, and a plane mirror 302, and fall on a screen 4 to form a 100 in. image. The rear projector has a small thickness. The distance between the plane mirror 302 and the screen 4 is 400 mm. The height of the lower end of the screen 4 from the first optical system 30 disposed in a lower part of the rear projector is small and the rear projector has a small overall height. The cone angle of light beams received by the first optical system 30 from the image-forming device 2 is 23.1° (f number is 2.5) and distortion is 0.06% or below. FIG. 18 is a front elevation of the rear projector, and FIG. 19 is a sectional view of the first optical system 30.

Figure 20:
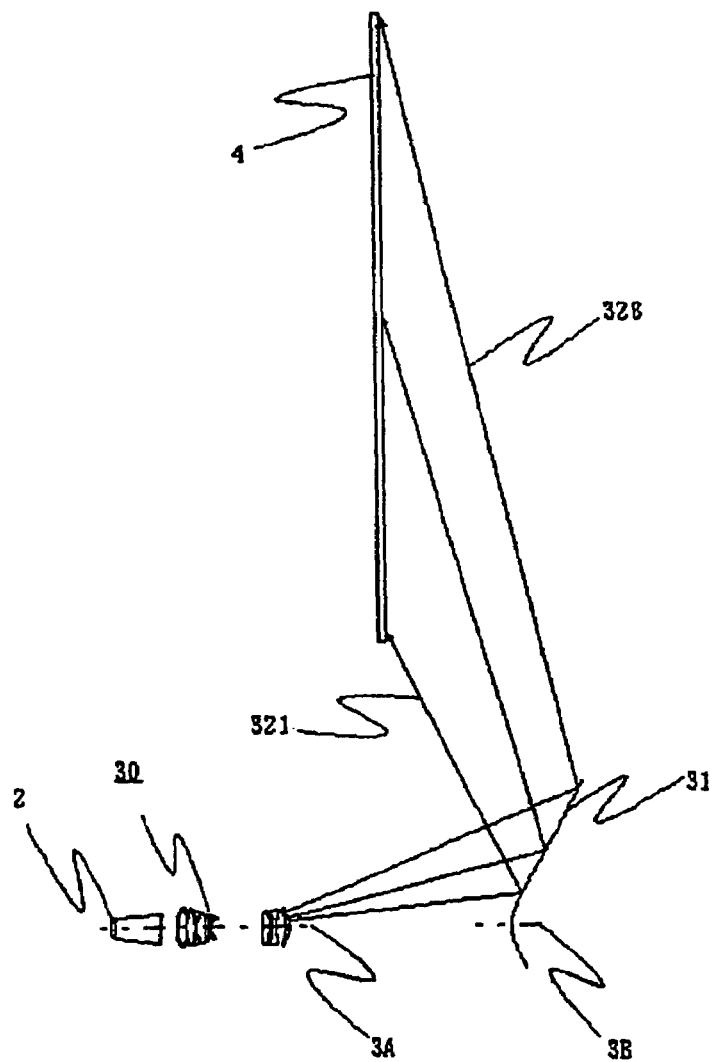
FIG. 20 is a sectional view of a projector in a seventh embodiment according to the present invention.

FIG. 20 is a sectional view of a projector in a seventh embodiment according to the present invention. An image-forming device 2 is provided with a 0.7 in. screen having an aspect ratio of 16:9. Light beams emitted by the image-forming device 2 travel through a first optical system 30 including refracting optical elements, and a second optical system 31 including a single reflecting mirror, and fall on a screen 4. It is a feature of this embodiment that the difference between the incidence angle of the light beam falling on the lower end of the screen 4 and that of the light beam falling on the upper end of the screen 4 is small. More concretely, the incidence angle of the light beam on the lower end of the screen 4 is 63°, the incidence angle of the light beam on the upper end of the screen 4 is 77°, and hence the difference is 14°. The distance of projection is short. The distance S2 between the reference axis 3B of the second optical system 31 and the screen 4 is 167 mm, and the distance S1 between the first optical system 30 and the second optical system 31 is 300 mm, which is longer than the distance S2. When applying the projector to a practical use, the projector may be additionally provided with a plane mirror to fold the optical path of the projector. Although S1>S2, the distances D1 and D2 along a light beam 321 meet a condition: D1<D2. FIG. 21 is a sectional view of the first optical system 30. The cone angle of the light beams received by the first optical system 30 from the image-forming device 2 is 23° (f number is 2.5).

FIG. 22 shows a rear projector in an eighth embodiment according to the present invention similar to the rear projector in the fifth embodiment. This rear projector has first and second optical systems comprising only reflecting mirrors. This rear projector differs from that in the fifth embodiment in that the first optical system includes three reflecting mirrors 30a, 30b and 30c, and the second optical system includes a single reflecting mirror. An image produced by a 0.7 in. image-forming device 2 is projected in an enlarged 40 in. image on a screen 4. All the reflecting mirrors have rotationally symmetric aspheric surfaces having axis of rotation symmetry, respectively. All the reflecting mirrors are decentered and do not have any common optical axis. A reference axis 3A is supported to be an expedient common reference axis of the first and the second optical systems for defining the degrees of decentering of the reflecting mirrors. This axis has no physical significance and is an entirely expedient axis. The cone angle of light beams received by the first optical system from the image-forming device 2 is 16.4° (f number is 3.5), which enables the projection of a sufficiently bright image on the screen 4. The distance between the plane mirror 301 and the screen 4, i.e., the thickness of the rear projector, is 160 mm.

Figure 23:
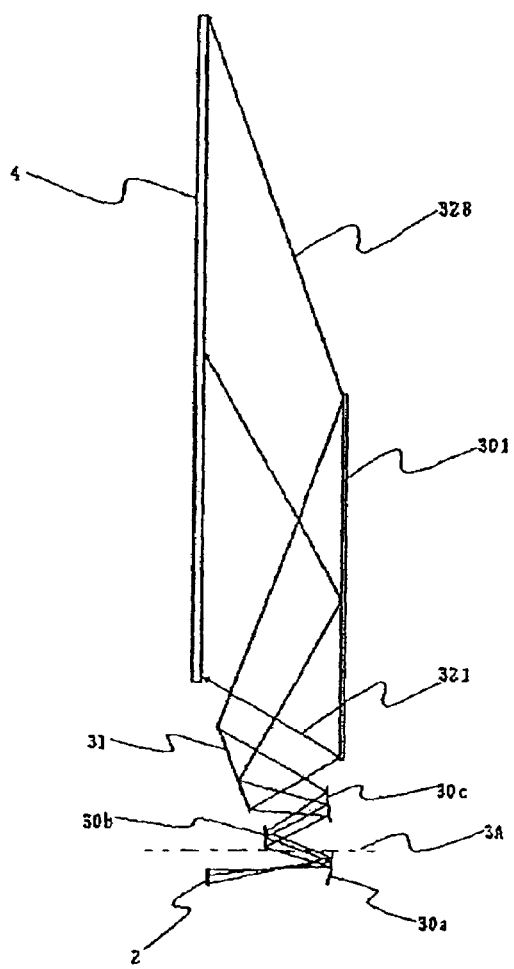
FIG. 23 is a sectional view of a rear projection display in a ninth embodiment according to the present invention.
Figure 24:
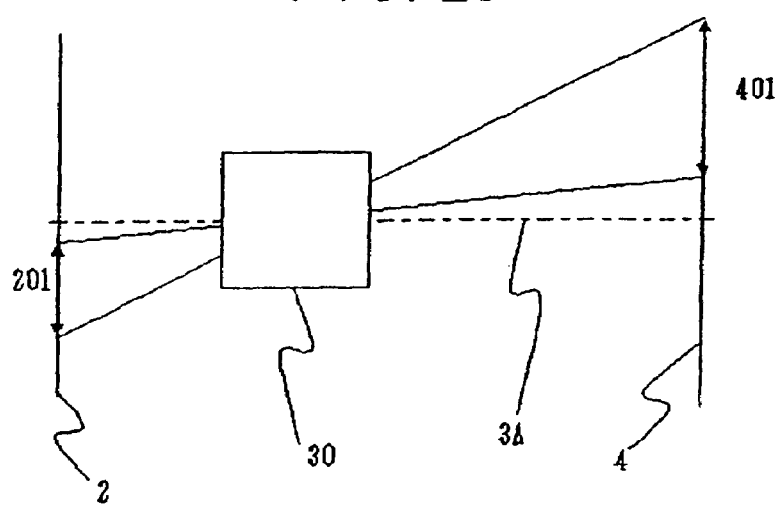
FIG. 24 is a diagrammatic view of assistance in explaining the principle of an oblique-incidence imaging optical system of the decenter system.
Figure 25:
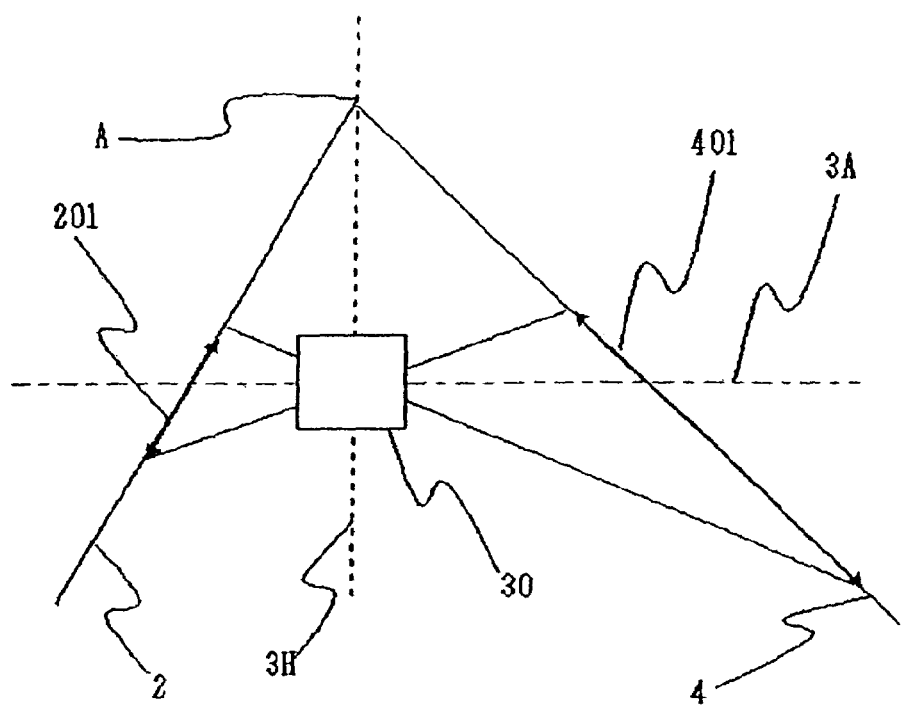
FIG. 25 is a diagrammatic view of assistance in explaining the principle of an oblique-incidence imaging optical system of the tilt system.
Figure 26:
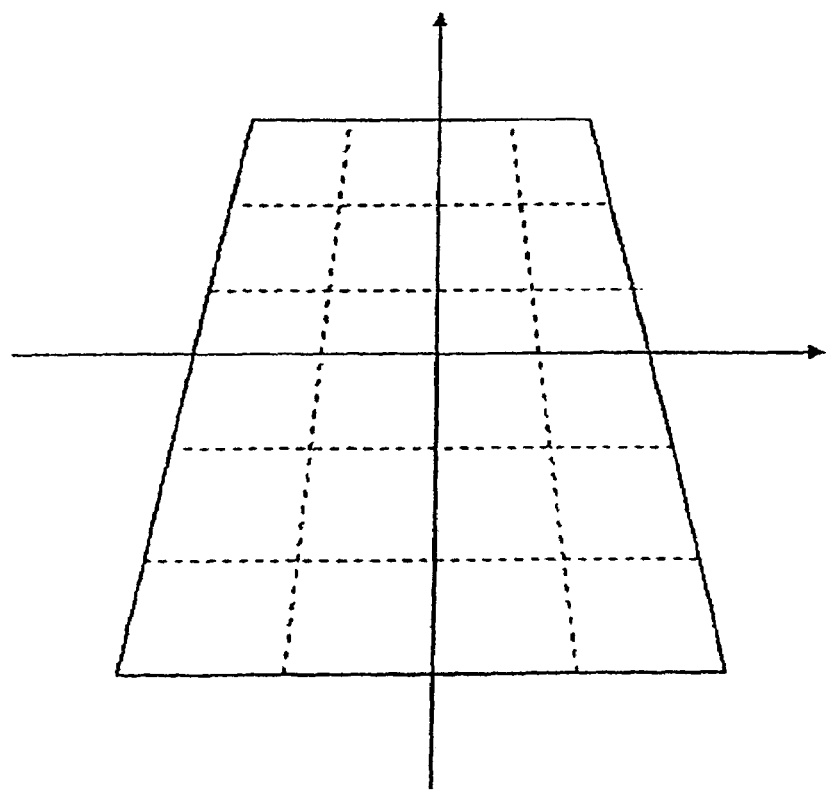
FIG. 26 is a conceptual diagrammatic view of assistance in explaining the distortion of an image formed by an oblique-incidence imaging optical system of the tilt system.
Figure 27A:
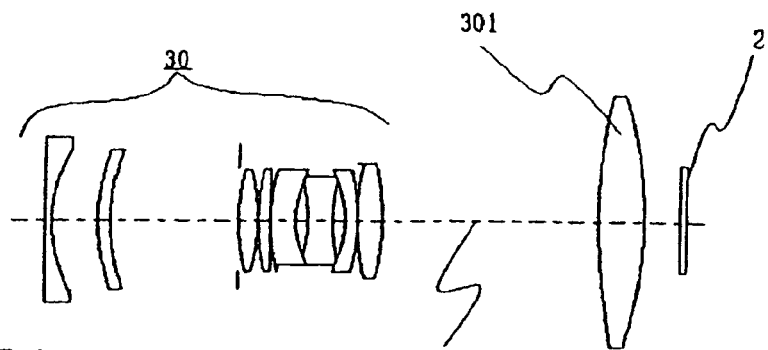
FIGS. 27(a) and 27(b) are sectional views of a projection lens disclosed in JP-A No. Hei 05-273460.
Figure 27B:
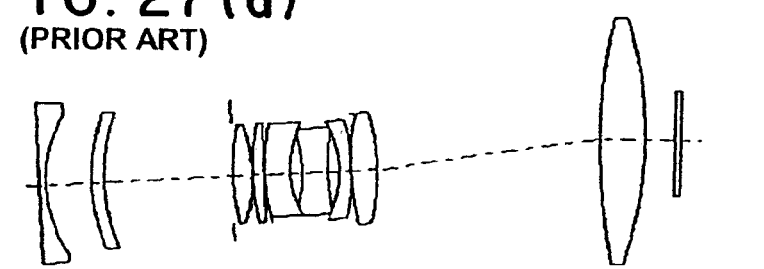
Figure 28:
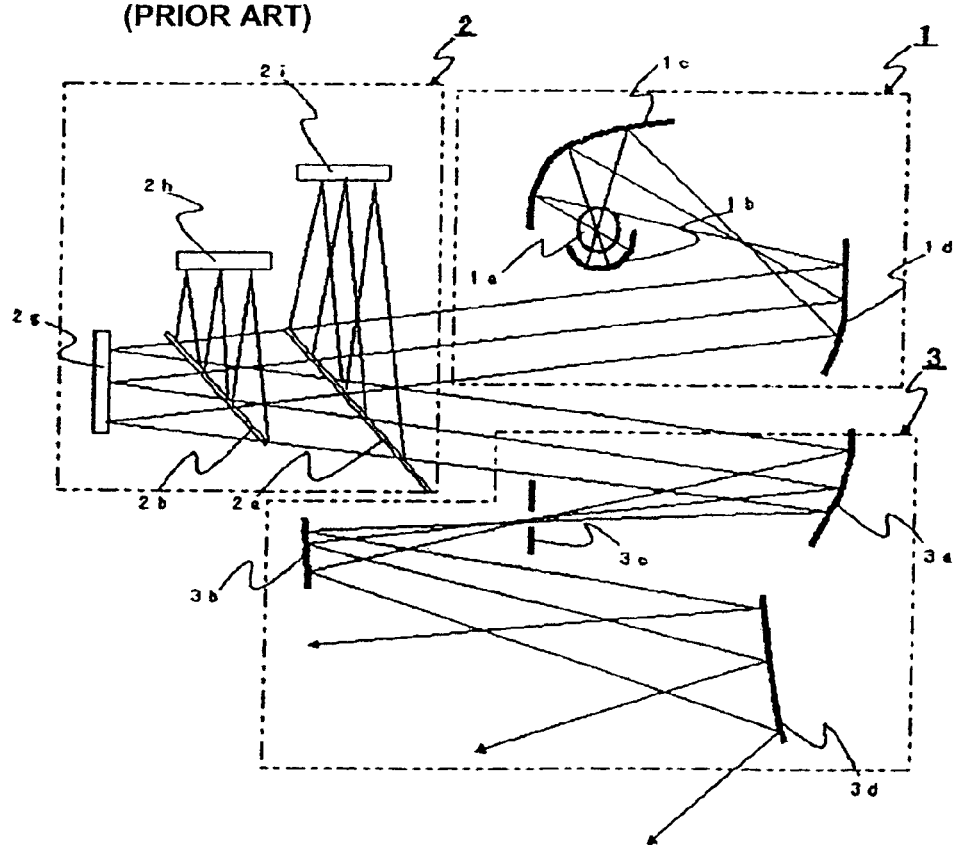
FIG. 28 is a sectional view of a projector disclosed in U.S. Pat. No. 5,871,266.
Figure 29:
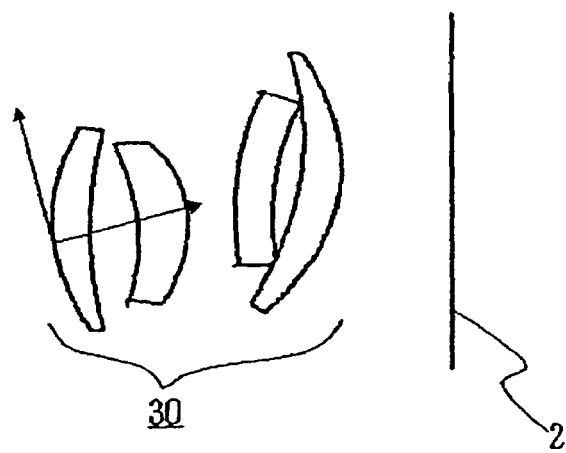
FIG. 29 is a sectional view of a projection lens disclosed in JP-A No. Hei 10-206791.
Figure 30:
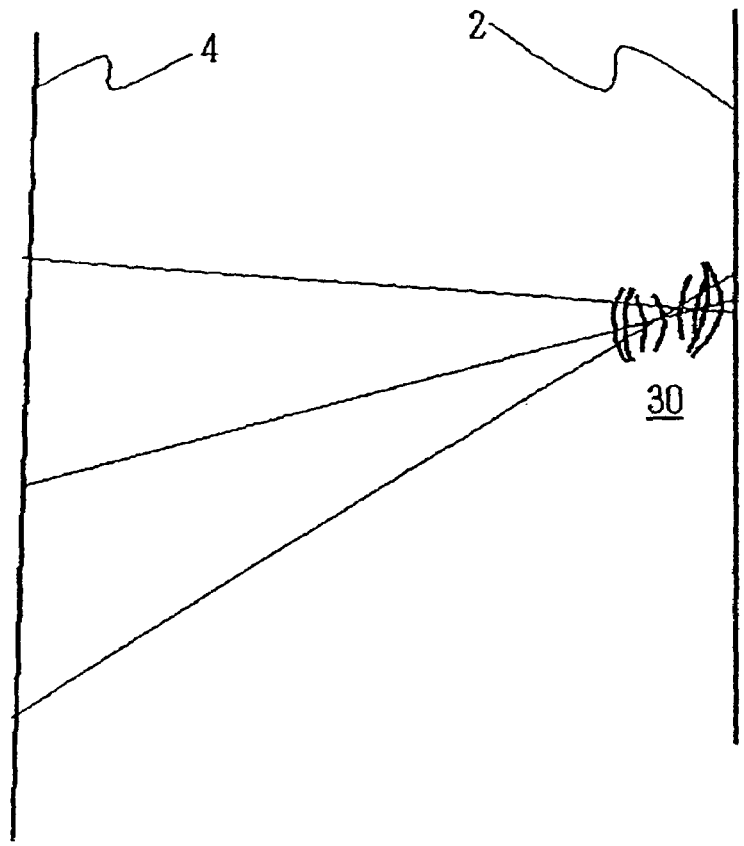
FIG. 30 is a sectional view of assistance in explaining a mode of image projection by the projector disclosed in JP-A No. Hei 10-206791.
Figure 31:
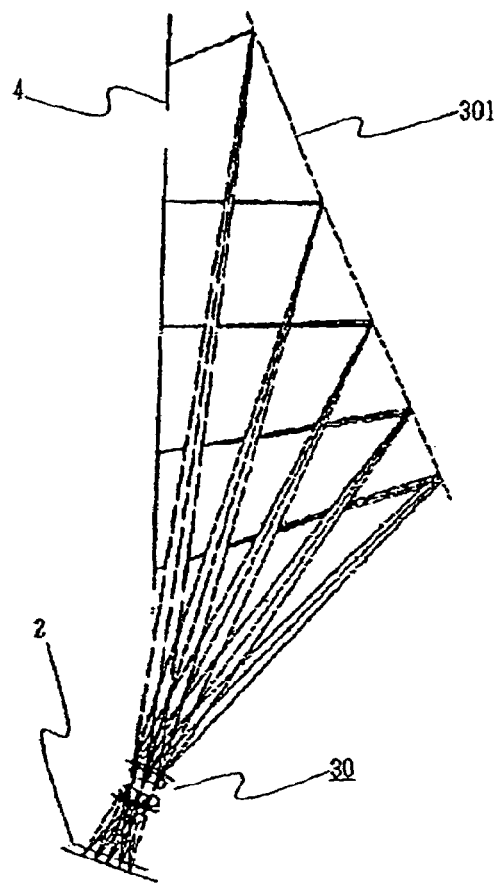
FIG. 31 is a sectional view of a rear projection display disclosed in U.S. Pat. No. 5,274,406.
Figure 32:
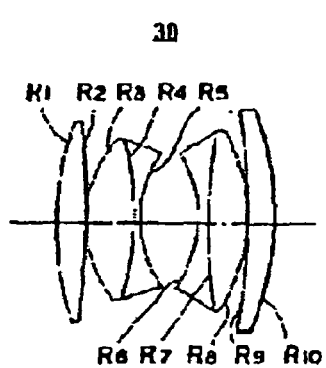
FIG. 32 is a sectional view of a projection lens included in the rear projection display disclosed in U.S. Pat. No. 5,274,406.
Figure 33A:
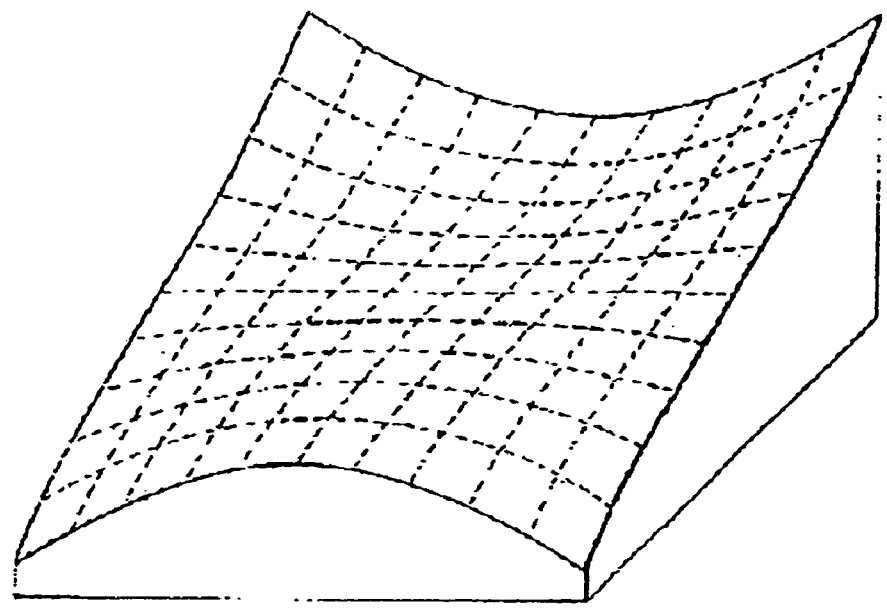
FIGS. 33(a) and 33(b) are perspective views of Fresnel mirrors employed in the rear projection display disclosed in U.S. Pat. No. 5,274,406.
Figure 33B:
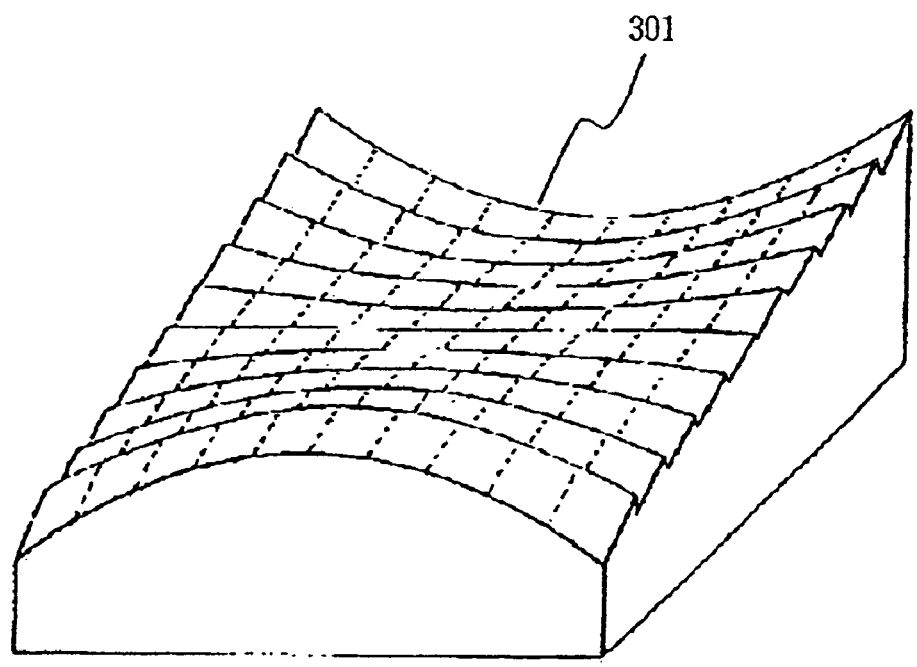
Figure 34:
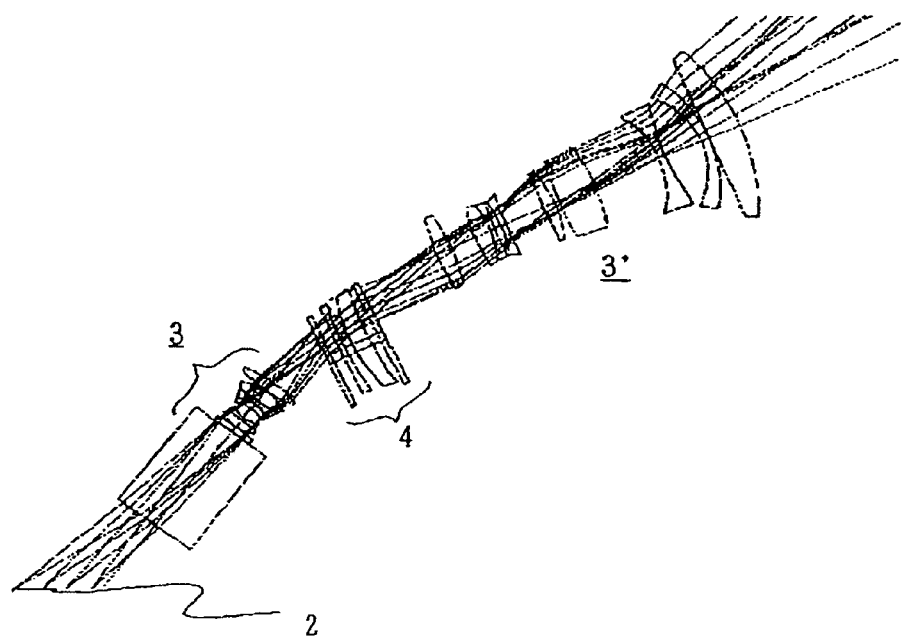
FIG. 34 is a sectional view of a projection optical system included in an oblique-incidence imaging optical system disclosed in JP-A No. Hei 06-265814.
Figure 35:
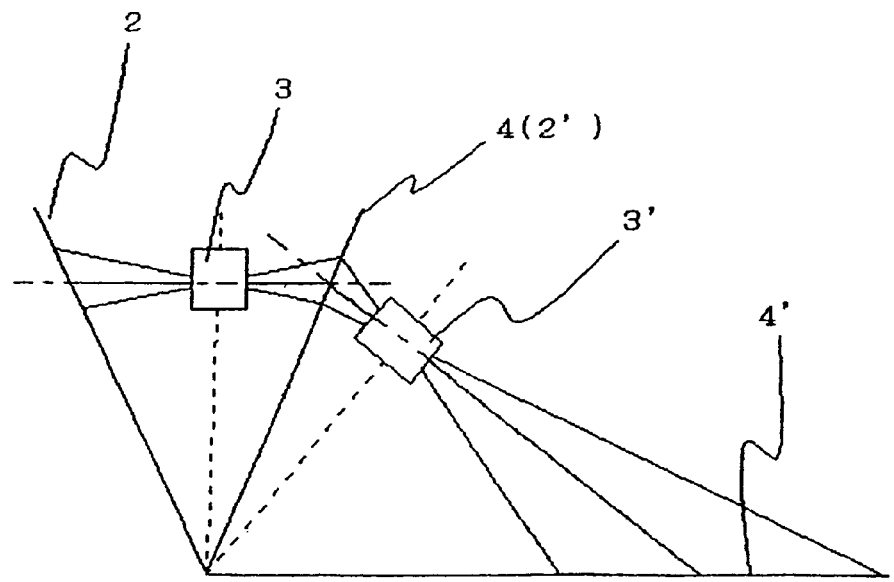
FIG. 35 is a diagrammatic view of assistance in explaining a multistage tilt system.
Figure 36:
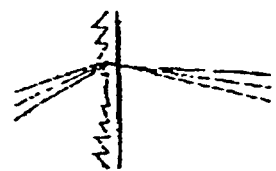
FIG. 36 is a sectional view of a pupil-coupling element employed in the multistage tilt system.
Figure 37:
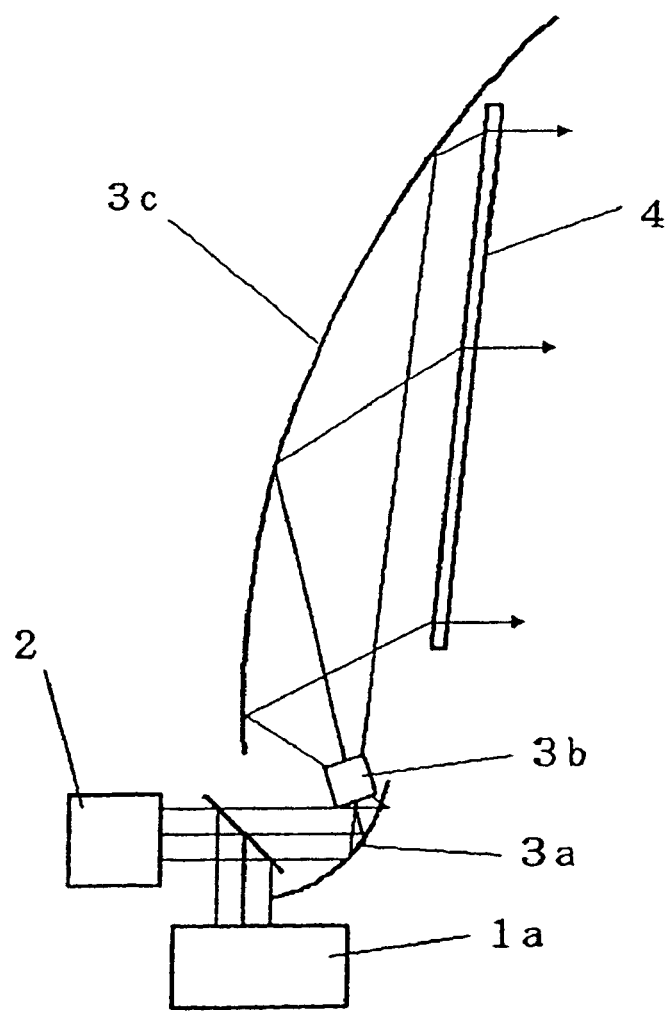
FIG. 37 is a sectional view of a rear projection display disclosed in JP-A No. Hei 07-13157.
Figure 38:
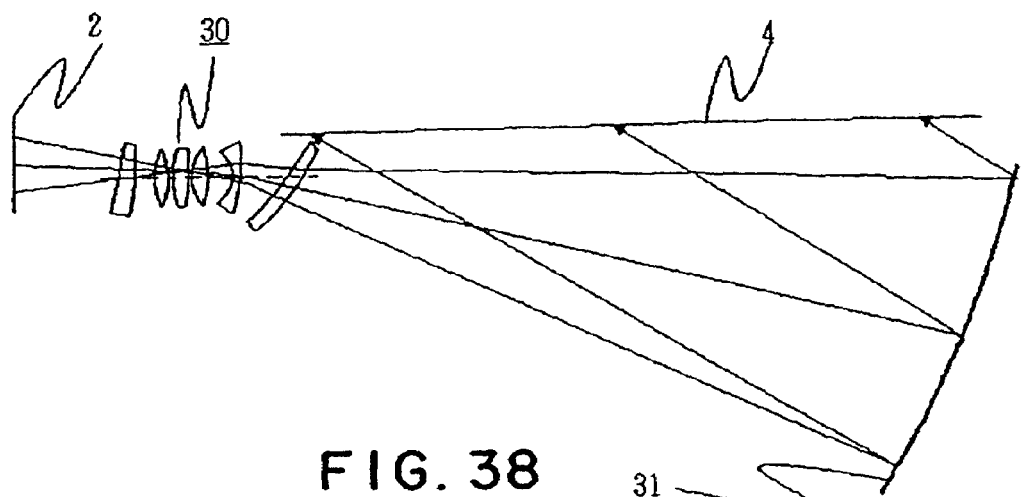
FIG. 38 is a sectional view of a projector disclosed in JP-A No. Hei 09-179064.
Figure 39:
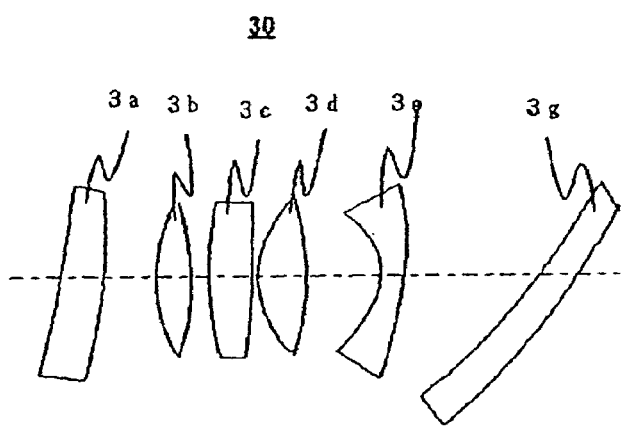
FIG. 39 is a sectional view of a projection lens included in the projector disclosed in JP-A No. Hei 09-179064.
Figure 40:
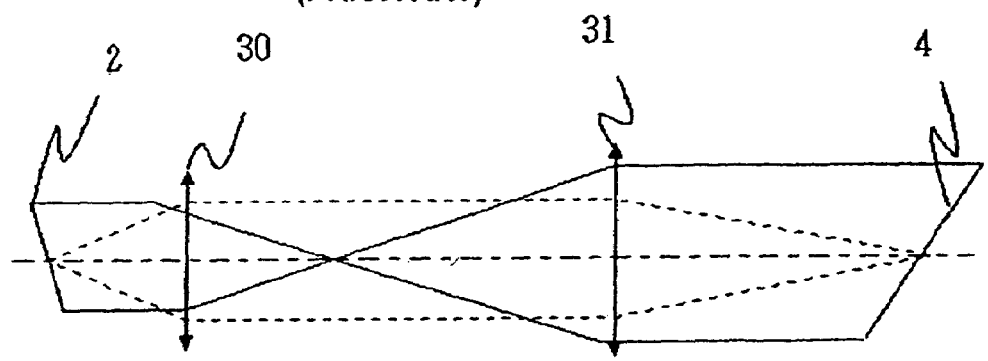
FIG. 40 is a diagrammatic view of assistance in explaining the principle of an afocal tilt system.
Figure 41:
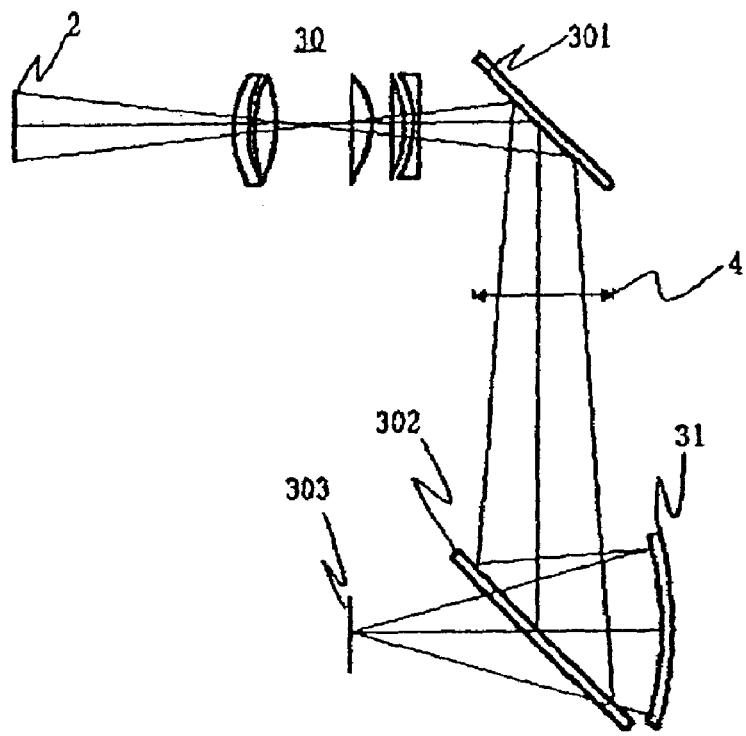
FIG. 41 is a sectional view of a typical head-mounted display (HMD)
Figure 42:
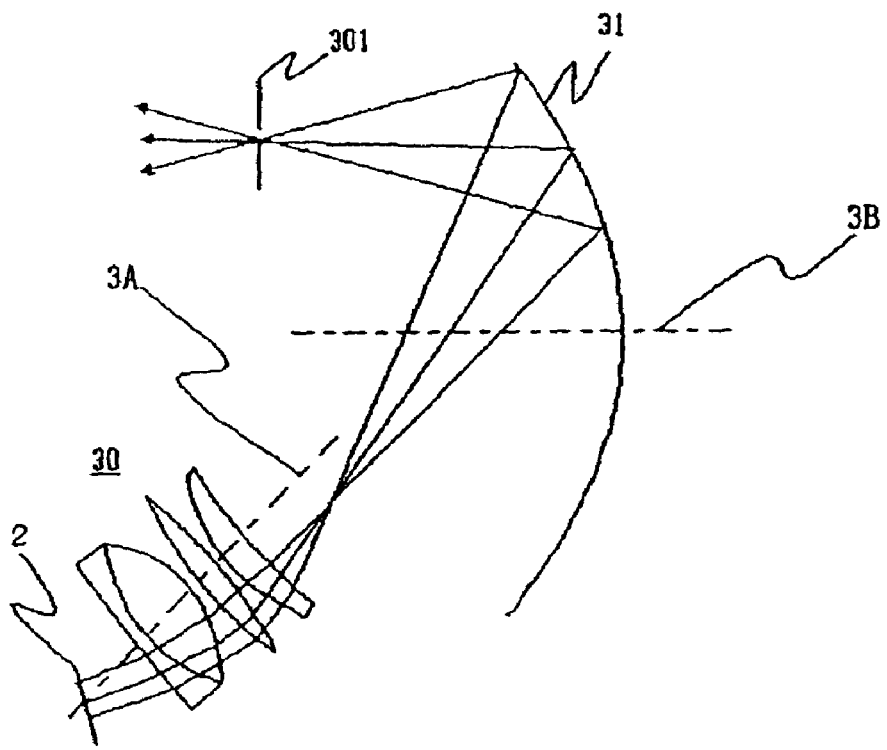
FIG. 42 is a sectional view of a HMD disclosed in JP-A No. Hei 05-303055.
Figure 43:
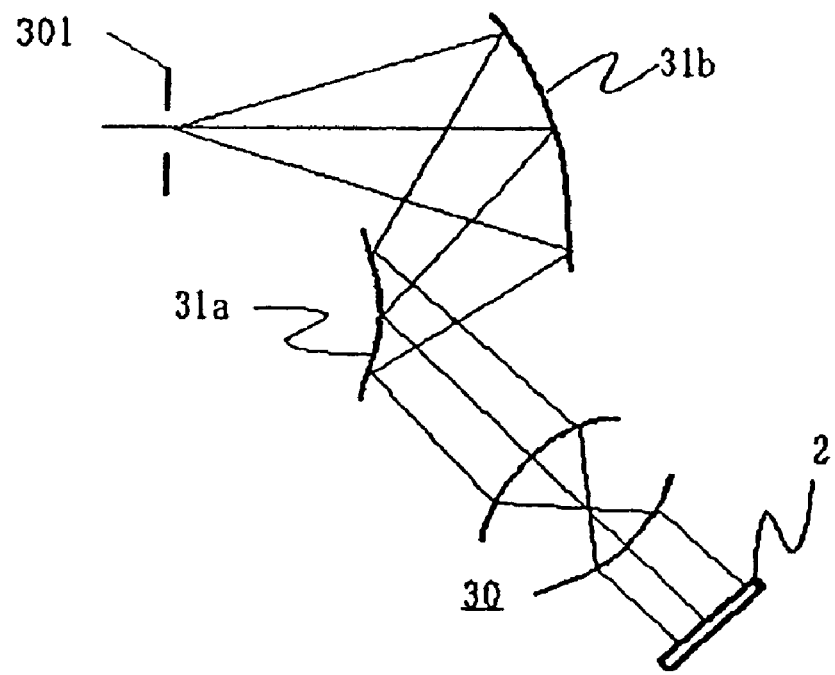
FIG. 43 is a sectional view of a HMD disclosed in JP-A No. Hei 07-191274.
Figure 44:
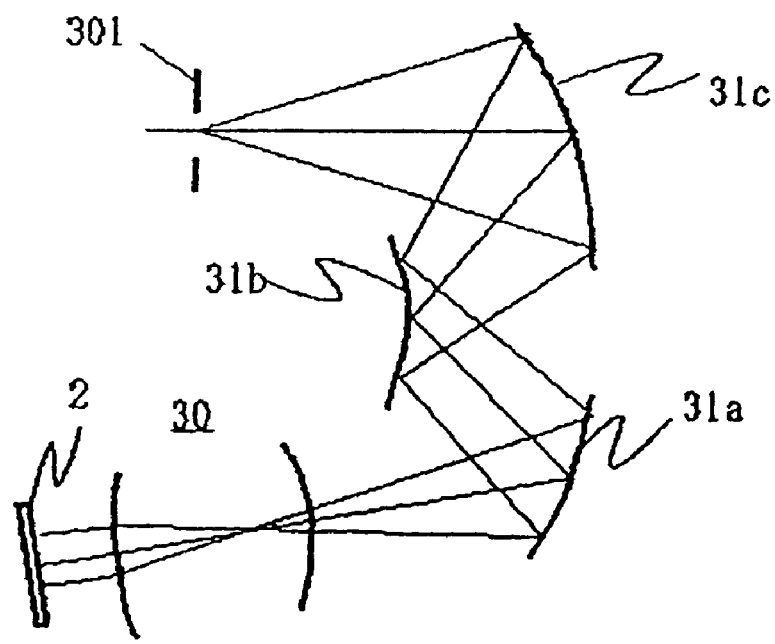
FIG. 44 is a sectional view of a HMD disclosed in JP-A No. Hei 07-191274.
Figure 45:
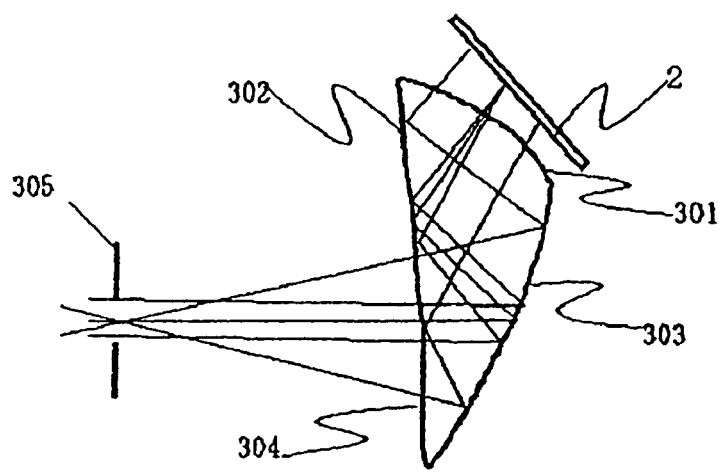
FIG. 45 is a sectional view of a HMD disclosed in JP-A No. Hei 10-239631.
Figure 46:
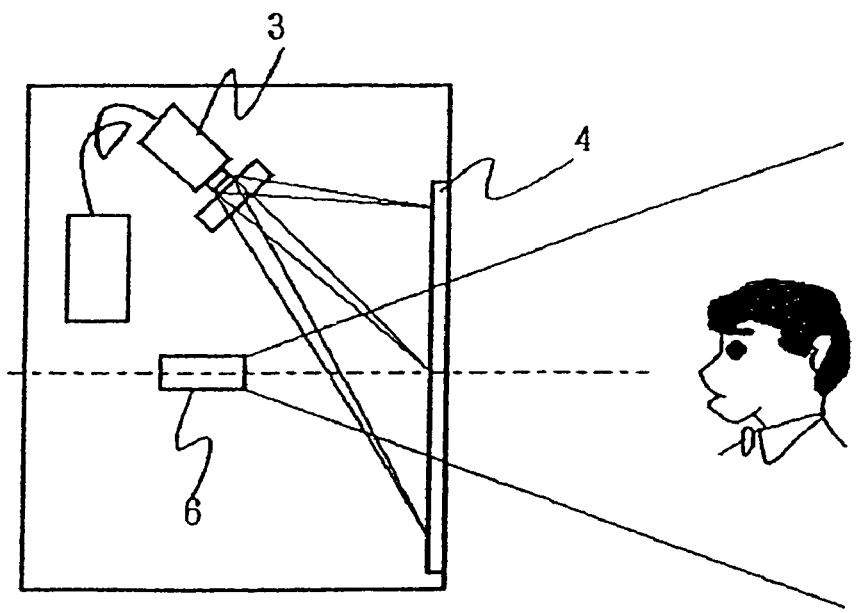
FIG. 46 is a conceptual view of a videophone system disclosed in JP-A No. Hei 06-133311.

FIG. 23 is a sectional view of a rear projector in a ninth embodiment according to the present invention. Although basically the same in construction as the rear projector in the eighth embodiment, this rear projector in the ninth embodiment has a first optical system 30 including three reflecting mirrors respectively having free-form surfaces. Although the rear projector is capable of projecting light beams on a screen 4 to form a 40 in. image, the distance between a plane mirror 301 and the screen 4 is only 125 mm, which is only 25% of a diagonal. Although various defining equations can be applied to define the free-form surfaces, this embodiment employs Zernike's polynomials. The component optical elements are decentered greatly. A third reflecting mirror 30c of the first optical system 30 has an angle of rotational decentering of about 35°. A paraxial way of thinking cannot be applied any more to this optical system, which is apparent from the focal length f1 of 5.49 mm of the first optical system and the focal length f of −1.34 mm of the entire system calculated on the basis of paraxial values. In the vicinity of a reference axis, the first optical system is a converging system and the second optical system is a diverging system. The cone angle of light beams received by the first optical system from an image-forming device 2 is 14.4° (f number is 4).

The projectors in preferred embodiments have been described. It is important to constitute an oblique-incidence imaging system regardless of the components of the concrete optical systems of the refracting and reflecting system by satisfying the basic conditions, which expands the range of selection of concrete means for realizing an oblique-incidence optical system according to the level of available techniques and manufacturing costs.

Numerical values relating to the foregoing embodiments will be given.

Table 7 shows numerical values for the first embodiment by way of example. In Table 7, numbers 1 to 14 correspond to reference numerals 1 to 14 in FIG. 3 showing the first optical system 30, respectively. Refractive indices and variances correspond to values for the surfaces, respectively. A number 0 indicates the image-forming device 2, and d0 is the distance along the optical axis between the image-forming device 2 and the first surface 41 of the first optical system.

TABLE 7

| Number | Radius R of curvature | Interval d | Refractive index n | Variance vd |
|---|---|---|---|---|
| 0 | 0.00 | 46.89 | 1.00000 | |
| 1 | 132.14 | 8.80 | 1.61272 | 58.60 |
| 2 | −75.09 | 0.10 | 1.00000 | |
| 3 | 60.21 | 18.00 | 1.61272 | 58.60 |
| 4 | −117.38 | 1.50 | 1.71736 | 29.50 |
| *5 | 46.92 | 50.63 | 1.00000 | |
| 6 | 163.32 | 1.50 | 1.68893 | 31.20 |
| 7 | 46.29 | 12.00 | 1.61272 | 58.60 |

TABLE 7-continued

| Number | Radius R of curvature | Interval d | Refractive index n | Variance vd |
|---|---|---|---|---|
| 8 | −110.33 | 27.71 | 1.00000 | |
| 9 | 278.19 | 12.00 | 1.61272 | 58.60 |
| 10 | −86.98 | 0.10 | 1.00000 | |
| 11 | 64.25 | 34.19 | 1.69700 | 48.50 |
| 12 | 38.97 | 15.10 | 1.00000 | |
| 13 | −31.77 | 3.00 | 1.64048 | 59.75 |
| *14 | 422.41 | 280.00 | 1.00000 | |
| *15 | 401.49 | −2000.00 | MIRROR | |
| 16 | 0.00 | 0.00 | 1.00000 | |

In Table 7, surfaces indicated at numbers with asterisk (*) are aspherical surfaces. In the first to the eighth embodiment, the aspherical surfaces are defined by the following expression. Although the aspherical surfaces may be defined by other expressions, the following expression is employed only because the same is used prevalently.

$$z = \frac{ch^2}{1 + \sqrt{1 - (1+k)c^2h^2}} + A_4 h^4 + A_6 h^6 + A_8 h^8 + \ldots + A_{26} h^{26}$$

where z is a depth along the optical axis from a reference plane including the apex of each aspherical surface, c is the reciprocal of the radius R of curvature, h is the distance of a point on the surface from the optical axis, k is conic constant and $A_4$ to $A_{26}$ are aspherical surface correction coefficients which are tabulated in Table 8.

TABLE 8

| Degree | Aspherical surface 5 | Aspherical surface 14 | Aspherical surface 15 |
|---|---|---|---|
| K | 0.439 | 248.749 | −7.2690E+00 |
| A4 | 1.3862E−06 | 7.4830E−07 | −1.6430E−08 |
| A6 | 3.0821E−10 | −3.2900E−09 | 5.1019E−13 |
| A8 | −1.0760E−11 | 1.5662E−11 | −8.4150E−18 |
| A10 | 6.9165E−14 | −6.2460E−14 | 3.6849E−23 |
| A12 | 1.0057E−16 | 1.3482E−16 | −1.7400E−28 |
| A14 | −1.2250E−18 | −1.1350E−19 | 5.3673E−33 |
| A16 | −9.6450E−22 | −2.1580E−22 | −3.2500E−38 |
| A18 | 9.6730E−24 | 6.7512E−25 | 1.3007E−42 |
| A20 | 2.4747E−26 | −1.2460E−28 | 1.1514E−45 |
| A22 | −1.0400E−28 | −3.7560E−31 | −3.6110E−51 |
| A24 | −9.1410E−33 | −4.0710E−33 | −1.6490E−55 |
| A26 | 1.7644E−34 | 6.5807E−36 | −2.0690E−59 |

In Table 7, a surface No. 15 is a reflecting surface of the second optical system 31. This surface also is an aspherical surface expressed by the foregoing expression. In FIG. 3, d14 is the distance along the optical axis between a surface r14 of the first optical system and the second optical system 31, and d15 is the distance along the optical axis between the second optical system and the screen 4. The number 16 indicates the screen 4.

Numerical values relating to the second embodiment are tabulated in tables 9 and 10.

TABLE 9

| Number | Radius R of curvature | Interval d | Refractive index n | Variance vd |
|---|---|---|---|---|
| 0 | 0.00 | 0.00 | 1.00000 | |
| 1 | 0.00 | 32.44 | 1.51680 | 64.20 |

TABLE 9-continued

| Number | Radius R of curvature | Interval d | Refractive index n | Variance vd |
|---|---|---|---|---|
| 2 | 0.00 | 104.17 | 1.00000 | |
| *3 | 114.85 | 20.00 | 1.58913 | 61.30 |
| *4 | −112.32 | 237.00 | 1.00000 | |
| *5 | −97.19 | 10.00 | 1.51680 | 64.20 |
| *6 | −543.21 | 300.00 | 1.00000 | |
| *7 | −170.55 | 15.00 | 1.51680 | 64.20 |
| *8 | 127.52 | 700.00 | 1.00000 | |
| 9 | 0.00 | 0.00 | 1.00000 | |

TABLE 10

| Degree | Aspherical surface 3 | Aspherical surface 4 | Aspherical surface 5 | Aspherical surface 6 | Aspherical surface 7 | Aspherical surface 8 |
|---|---|---|---|---|---|---|
| K | −0.967 | −3.427 | −0.961 | 38.098 | −4.661 | −137.657 |
| A4 | −4.7621E−08 | −2.1521E−08 | −3.9210E−07 | −4.6976E−09 | −1.9806E−07 | −3.2553E−08 |
| A6 | −1.1887E−13 | −4.3560E−12 | 6.2030E−12 | −1.2979E−12 | 1.0092E−11 | 3.6760E−13 |
| A8 | −1.9196E−15 | 2.4159E−15 | −2.0548E−15 | −2.7614E−15 | −5.3323E−16 | −2.1936E−18 |
| A10 | −1.6656E−19 | −8.8558E−19 | −6.7797E−18 | 3.3560E−19 | 8.8135E−21 | 5.1099E−24 |

Numbers 3 and 4 correspond to data on the surface of a convex lens on the side of the image-forming device 2 of the first optical system 30 shown in FIG. 4, and numbers 5 and 6 correspond to data on the surface of a concave lens on the side of the screen of the same first optical system 30. Numbers 7 and 8 correspond to data on the surface of the optical element included in the second optical system 31. A number 0 correspond to the image-forming device 2, a number 9 corresponds to the screen 4, and numbers 1 and 2 correspond to color-synthesizing prisms.

Numerical values relating to the third embodiment are tabulated in tables 11 and 12. Numbers 1 to 11 correspond to r1 to r11 shown in FIG. 8, respectively, and numbers 0, 12, 13 and 14 correspond to the image-forming device 2, the folding plane mirror, the aspherical mirror 31 included in the second optical system and the screen, respectively.

TABLE 11

| Number | Radius R of curvature | Interval d | Refractive index n | Variance vd |
|---|---|---|---|---|
| 0 | 0.00 | 64.00 | | |
| 1 | 58.19 | 11.00 | 1.60300 | 65.50 |
| 2 | −273.18 | 32.30 | | |
| *3 | 75.74 | 9.00 | 1.60300 | 65.50 |
| 4 | −33.90 | 1.80 | 1.74000 | 31.70 |
| 5 | 228.46 | 67.00 | | |
| 6 | 1929.73 | 6.00 | 1.80400 | 46.60 |
| 7 | −78.35 | 18.60 | | |
| 8 | 53.10 | 24.00 | 1.60311 | 60.70 |
| 9 | 34.61 | 15.80 | | |
| *10 | −22.93 | 3.00 | 1.60311 | 60.70 |
| 11 | −83.73 | 100.00 | | |
| 12 | 0.00 | −200.00 | MIRROR | |
| *13 | −191.80 | −450.00 | MIRROR | |
| 14 | 0.00 | 0.00 | | |

TABLE 12

| Degree | Aspherical surface 3 | Aspherical surface 10 | Aspherical surface 13 |
|---|---|---|---|
| K | −2.578 | −0.228 | −7.226 |
| A4 | −1.0273E−06 | 1.5697E−06 | 4.5923E−09 |

TABLE 12-continued

| Degree | Aspherical surface 3 | Aspherical surface 10 | Aspherical surface 13 |
|---|---|---|---|
| A6 | −6.6235E−10 | −2.2420E−09 | −7.5917E−14 |
| A8 | −7.2979E−13 | 2.3452E−11 | 8.6846E−19 |
| A10 | −6.8308E−15 | −4.6973E−14 | −5.1711E−24 |
| A12 | 4.2929E−17 | 3.5456E−18 | −1.6600E−30 |
| A14 | −1.0068E−19 | 1.7720E−19 | 1.9636E−34 |
| A16 | 7.3009E−23 | −2.0286E−22 | −7.4399E−40 |

Numerical values relating to the fourth embodiment are tabulated in tables 13 and 14. Numbers 1 to 13 correspond to r1 to r13 shown in FIG. 12, respectively. Reference character r14 indicates data on the surface of the reflecting surface 31 of the second optical system. This optical system corrects aberration for a wider range of image height to deal with the movement of the image. Numbers 0 and 15 correspond to the image-forming device 2 the screen, respectively.

TABLE 13

| Number | Radius R of curvature | Interval d | Refractive index n | Variance vd |
|---|---|---|---|---|
| 0 | 0.00 | 61.24 | 1.00000 | |
| 1 | 51.50 | 14.00 | 1.62000 | 62.20 |
| 2 | 8402.87 | 29.53 | 1.00000 | |
| *3 | 76.31 | 11.00 | 1.62000 | 62.20 |
| 4 | −30.99 | 2.00 | 1.74000 | 31.70 |
| 5 | 237.26 | 61.38 | 1.00000 | |
| 6 | 358.55 | 16.40 | 1.69350 | 53.30 |
| 7 | −68.17 | 5.23 | 1.00000 | |
| 8 | 59.70 | 22.00 | 1.61310 | 44.40 |
| 9 | 2509.25 | 1.70 | 1.00000 | |
| 10 | −254.23 | 3.00 | 1.53256 | 45.90 |
| 11 | 38.57 | 16.99 | 1.00000 | |
| *12 | −26.00 | 3.00 | 1.62000 | 62.20 |
| 13 | −139.86 | 300.00 | 1.00000 | |
| *14 | 205.53 | −700.00 | MIRROR | |
| 15 | 0.00 | 0.00 | 1.00000 | |

TABLE 14

| Degree | Aspherical surface 3 | Aspherical surface 12 | Asphe-rical surface 14 |
|---|---|---|---|
| K | −6.351 | −0.088 | −7.181 |
| A4 | −4.5222E−07 | 9.8683E−07 | −5.1802E−09 |
| A6 | −1.3212E−09 | −1.4119E−09 | 9.4568E−14 |
| A8 | −8.3071E−13 | 1.9531E−11 | −1.1176E−18 |
| A10 | −4.8053E−15 | −3.9940E−14 | 6.5972E−24 |
| A12 | 3.2936E−17 | 2.8893E−17 | 3.3104E−31 |
| A14 | −8.1805E−20 | 3.8128E−20 | −2.0325E−34 |
| A16 | 7.4349E−23 | −3.7771E−23 | 7.1276E−40 |

Numerical values relating to the fifth embodiment are tabulated in tables 15 and 16.

This is a numerical example of a rear projector having an imaging system including only reflecting mirrors. Numbers 3 and 4 in Table 15 are surface data corresponding to the reflecting mirrors 30a and 30b shown in FIG. 16, respectively. A number 5 in Table 15 corresponds to surface data on the reflecting mirror 31 of the second optical system 31. Surface data 0 is the image-forming device 2, surface data 6 is the plane reflecting mirror 301, and surface numbers 1 and 2 are color-synthesizing prisms.

TABLE 15

| Number | Radius R of curvature | Interval d | Refractive index n | Variance vd |
|---|---|---|---|---|
| 0 | 0.00 | | 1.00000 | |
| 1 | 0.00 | 32.44 | 1.51680 | 64.20 |
| 2 | 0.00 | 142.35 | 1.00000 | |
| *3 | −224.00 | −250.00 | MIRROR | |
| *4 | −306.02 | 230.00 | MIRROR | |
| *5 | 207.25 | −240.00 | MIRROR | |
| 6 | 0.00 | 280.00 | MIRROR | |
| 7 | 0.00 | 0.00 | 1.00000 | |

TABLE 16

| Degree | Aspherical surface 3 | Aspherical surface 4 | Aspherical surface 5 |
|---|---|---|---|
| K | −0.069 | 16.832 | −10.626 |
| A4 | 1.2148E−10 | −1.0440E−07 | −4.6180E−09 |
| A6 | −1.2979E−12 | 1.6437E−11 | 5.7203E−14 |
| A8 | −6.9055E−17 | 5.9316E−15 | −4.1342E−19 |
| A10 | 8.8408E−20 | −1.2979E−18 | 1.2506E−24 |

Numerical values relating to the sixth embodiment are tabulated in tables 17 and 18. Numbers 1 to 14 correspond to r1 to r14 of the first optical system shown in FIG. 19, respectively, and numbers 15, 16 and 17 correspond to the plane mirror for 90°-folding, the aspherical reflecting mirror 31 of the second optical system and the folding reflecting mirror 301, respectively. A number 0 and 18 corresponds to the image-forming device 2 and the screen 4, respectively.

TABLE 17

| Number | Radius R of curvature | Interval d | Refractive index n | Variance vd |
|---|---|---|---|---|
| 0 | 0.00 | 45.62 | 1.00000 | |
| 1 | 118.08 | 8.80 | 1.56883 | 56.00 |
| 2 | −71.33 | 0.10 | 1.00000 | |
| 3 | 54.78 | 18.00 | 1.56883 | 56.00 |
| 4 | −98.49 | 1.50 | 1.71736 | 29.50 |
| *5 | 57.02 | 28.05 | 1.00000 | |
| 6 | 216.13 | 1.50 | 1.68893 | 31.20 |
| 7 | 45.58 | 12.00 | 1.56883 | 56.00 |
| 8 | −112.64 | 55.48 | 1.00000 | |
| 9 | 254.11 | 12.00 | 1.56883 | 56.00 |
| 10 | −88.77 | 0.10 | 1.00000 | |
| 11 | 55.71 | 34.13 | 1.69700 | 48.50 |
| 12 | 31.90 | 14.44 | 1.00000 | |
| 13 | −27.54 | 3.00 | 1.64048 | 59.75 |
| *14 | −233.03 | 80.00 | 1.00000 | |
| 15 | 0.00 | −200.00 | MIRROR | |
| *16 | −162.77 | 350.00 | MIRROR | |
| 17 | 0.00 | −400.00 | MIRROR | |
| 18 | 0.00 | 0.00 | 1.00000 | |

TABLE 18

| Degree | Aspherical surface 5 | Aspherical surface 14 | Aspherical surface 16 |
|---|---|---|---|
| K | 0.419 | 8.885 | −6.765 |
| A4 | 1.7575E−06 | 4.0485E−07 | 5.1924E−09 |
| A6 | 3.5104E−09 | −1.1450E−09 | −8.1620E−14 |
| A8 | −3.5400E−11 | 1.0964E−11 | 8.1952E−19 |
| A10 | 1.5737E−13 | −5.9200E−14 | −4.0570E−24 |
| A12 | −1.4420E−17 | 1.5071E−16 | 8.0087E−30 |
| A14 | −1.3420E−18 | −1.1300E−19 | −1.8850E−34 |
| A16 | −5.2260E−22 | −2.5080E−22 | 2.0596E−39 |
| A18 | 1.2545E−23 | 5.6635E−25 | 1.7805E−45 |
| A20 | 1.3186E−27 | −2.9910E−28 | 1.2608E−50 |
| A22 | −2.1590E−29 | −5.5790E−32 | −7.9730E−55 |
| A24 | −1.9490E−31 | −2.8470E−35 | −5.7130E−60 |
| A26 | 3.7569E−34 | 7.8403E−38 | 6.6673E−65 |

Numerical values relating to the seventh embodiment are tabulated in tables 19 and 20. Numbers 1 to 17 correspond to r1 to r17 of the first optical system shown in FIG. 21, respectively. A number 18 corresponds to the aspherical reflecting mirror of the second optical system. A number 0 and 19 correspond to the image-forming device 2 and the screen 4, respectively. Although a color-synthesizing prism is disposed adjacently to the image-forming device as shown in FIG. 21, the color-synthesizing prism is represented by air-equivalent length.

TABLE 19

| Number | Radius R of curvature | Interval d | Refractive index n | Variance vd |
|---|---|---|---|---|
| 0 | 0.00 | 57.60 | 1.00000 | |
| *1 | 42.02 | 13.34 | 1.49180 | 57.40 |
| 2 | −95.32 | 0.20 | 1.00000 | |
| 3 | 79.94 | 10.25 | 1.60300 | 65.50 |
| 4 | −101.91 | 0.20 | 1.00000 | |
| 5 | −413.35 | 2.00 | 2.00330 | 28.27 |
| 6 | 34.87 | 10.37 | 1.60300 | 65.50 |
| 7 | −1899.87 | 0.20 | 1.00000 | |
| 8 | 47.31 | 7.07 | 1.80810 | 22.80 |
| 9 | 216.68 | 0.20 | 1.00000 | |
| 10 | 35.36 | 2.00 | 1.48749 | 70.20 |
| *11 | 19.06 | 70.22 | 1.00000 | |
| 12 | 359.84 | 8.71 | 2.00330 | 28.27 |
| 13 | −61.99 | 3.80 | 1.00000 | |
| *14 | −45.75 | 2.64 | 1.63930 | 44.90 |
| 15 | 62.36 | 15.25 | 1.00000 | |
| *16 | −40.00 | 3.50 | 1.49180 | 57.40 |
| *17 | −45.29 | 300.00 | 1.00000 | |
| *18 | 41.50 | −167.00 | MIRROR | |
| | 0 | 0 | | |

TABLE 20

| Degree | Aspherical surface 1 | Aspherical surface 11 | Aspherical surface 17 | Aspherical surface 18 |
|---|---|---|---|---|
| K | −1.39512 | −0.69407 | 1.22499 | −3.55242 |
| A4 | −4.3850E−06 | 6.1477E−06 | 1.9389E−06 | −1.2694E−08 |
| A6 | 1.4582E−09 | −1.5904E−09 | 2.5985E−10 | 3.1819E−13 |
| A8 | −2.2531E−13 | 2.9926E−11 | −4.4379E−13 | −3.1329E−18 |
| A10 | −8.5179E−17 | −5.9717E−14 | 1.5357E−15 | −8.2909E−23 |
| A12 | | | | 3.3215E−27 |
| A14 | | | | −4.0876E−32 |
| A16 | | | | 2.5544E−38 |
| A18 | | | | 3.5555E−38 |
| A20 | | | | −2.2263E−47 |

Numerical values relating to the eighth embodiment are tabulated in tables 21, 22 and 23. Numbers 3, 4 and 5 in Table 21 correspond to data on the surfaces of the reflecting mirrors 30a, 30b and 30c of the first optical system shown in FIG. 22, respectively. A number 6 in Table 21 corresponds to data on the surface of the reflecting mirror 31 of the second optical system 31. A number 8 corresponds to the screen 4, and numbers 1 and 2 corresponds to covering glass plates. Decentering distances for the reflecting mirrors are tabulated in Table 23. Y-decentering signifies upward decentering (positive decentering) in the paper, and x-axis rotation signifies clockwise rotation (rotation in the positive direction) in the paper.

TABLE 21

| Number | Radius R of curvature | Interval d | Refractive index n | Variance vd |
|---|---|---|---|---|
| 0 | 0.00 | 0.00 | 1.00000 | |
| *1 | 0.00 | 3.00 | 1.48749 | 70.20 |
| 2 | 0.00 | 47.45 | 1.00000 | |
| *3 | −58.87 | −44.01 | MIRROR | |
| *4 | −58.04 | 55.95 | MIRROR | |
| *5 | −275.83 | −97.16 | MIRROR | |
| *6 | −67.60 | 97.16 | MIRROR | |
| 7 | 0.00 | −160.00 | MIRROR | |
| 8 | 0.00 | 0.00 | 1.00000 | |

TABLE 22

| Degree | Aspherical surface 3 | Aspherical surface 4 | Aspherical surface 5 | Aspherical surface 6 |
|---|---|---|---|---|
| K | −0.4777 | −3.7602 | 0.0000 | −5.9287 |
| A4 | −3.1048E−07 | −6.8743E−06 | 3.5717E−07 | 4.8051E−08 |
| A6 | −2.3345E−10 | −3.9861E−09 | −7.7774E−11 | −2.8630E−12 |
| A8 | 2.1957E−13 | −6.3211E−11 | 1.0188E−14 | 1.1106E−16 |
| A10 | −1.2237E−16 | 4.0709E−13 | −7.3354E−19 | −2.7008E−21 |
| A12 | −8.2854E−20 | −1.0604E−15 | 2.1842E−23 | 3.7047E−26 |
| A14 | | | | −2.1837E−31 |

TABLE 23

| Number | Y-decentering | X-axis rotation |
|---|---|---|
| 3 | | 0.69 |
| 4 | 0.74 | −0.04 |
| 5 | 2.24 | −0.20 |
| 6 | 2.16 | 0.05 |

Numerical values relating to the ninth embodiment are tabulated in tables 24, 25, 26 and 27. Basic explanation of those numerical values tabulated in Tables 24, 25 and 26 is the same as that of the numerical values relating to the eighth embodiment. Coefficients for extending aspherical surfaces to free-form surfaces are tabulated in Table 27. Those coefficients are for additional Zernike's polynomials for expressing free-form surfaces in addition to the aspherical surfaces. The selection of those, similarly to the selection of the defining equation for defining the aspherical surfaces, is expedient, and other defining equation may be used. Polynomials corresponding to the coefficients are given below Table 27.

TABLE 24

| Number | Radius R of curvature | Interval d | Refractive index n | Variance vd |
|---|---|---|---|---|
| 0 | 0.00 | 0.00 | 1.00000 | |
| 1 | 0.00 | 3.00 | 1.48749 | 70.20 |

TABLE 24-continued

| Number | Radius R of curvature | Interval d | Refractive index n | Variance vd |
|---|---|---|---|---|
| 2 | 0.00 | 111.89 | 1.00000 | |
| *3 | −99.09 | −61.35 | MIRROR | |
| *4 | −150.67 | 65.88 | MIRROR | |
| *5 | −17.28 | −80.26 | MIRROR | |
| *6 | −45.42 | 80.26 | MIRROR | |
| 7 | 0.00 | −125.00 | MIRROR | |
| 8 | 0.00 | 0.00 | 1.00000 | |

TABLE 25

| Degree | Aspherical surface 3 | Aspherical surface 4 | Aspherical surface 5 | Aspherical surface 6 |
|---|---|---|---|---|
| K | 3.0923 | 11.8991 | −1.2208 | −7.1652 |
| A4 | 5.2959E−07 | 1.4526E−06 | 3.3385E−06 | 1.2521E−07 |
| A6 | 1.9358E−10 | 3.0479E−09 | −6.419E−10 | −1.4744E−11 |
| A8 | −9.1311E−15 | −1.2760E−13 | 1.5704E−13 | 1.1538E−15 |
| A10 | 2.9509E−17 | 6.4874E−17 | −1.2058E−17 | −5.6704E−20 |
| A12 | | | | 1.5663E−24 |
| A14 | | | | −1.8473E−29 |

TABLE 26

| Number | Y-decentering | X-axis rotation |
|---|---|---|
| 3 | | −1.78 |
| 4 | −13.07 | 24.43 |
| 5 | 9.85 | −34.91 |
| 6 | 27.80 | −3.35 |

TABLE 27

| Degree | Zernike 3 | Zernike 4 | Zernike 5 |
|---|---|---|---|
| 1 | | | |
| 2 | | | |
| 3 | 2.2803E−02 | −2.7053E−01 | −1.8405E−01 |
| 4 | 1.8972E−04 | 8.3429E−04 | 1.6732E−02 |
| 5 | | | |
| 6 | −8.1097E−05 | −7.7138E−04 | −6.1242E−03 |
| 7 | −5.6180E−07 | −4.4644E−06 | −1.4254E−04 |
| 8 | | | |
| 9 | 4.0821E−08 | −2.8891E−06 | 2.2379E−05 |
| 10 | | | |
| 11 | −8.9052E−09 | −1.1475E−07 | 2.8221E−07 |
| 12 | 1.7020E−10 | 3.3320E−08 | −5.2899E−07 |
| 13 | | | |
| 14 | −1.7338E−10 | 6.0622E−09 | −1.5702E−07 |
| 15 | | | |
| 16 | | | |
| 17 | −9.5911E−12 | 5.7540E−10 | 8.4471E−10 |
| 18 | | | |
| 19 | 1.0418E−11 | 1.7730E−10 | 1.0706E−09 |
| 20 | | | |
| 21 | −1.8783E−11 | −1.1520E−11 | 2.2288E−09 |
| 22 | −1.0294E−12 | −6.3528E−11 | −1.0883E−11 |
| 23 | | | |
| 24 | −2.7047E−13 | −5.7456E−12 | 5.4642E−12 |
| 25 | | | |
| 26 | −2.8390E−13 | −4.4963E−13 | 2.6375E−12 |

Expressions of only terms which are not zero in Table 27 among Zernike's additive terms are enumerated below. Numerals on the left side of the expressions correspond to the degrees tabulated in Table 27.

$3 \Rightarrow \sqrt{4}\rho \sin \phi$ $4 \Rightarrow \sqrt{3}(2\rho^2-1)$ $6 \Rightarrow \sqrt{6}\rho^2 \cos 2\phi$ $7 \Rightarrow \sqrt{8}(3\rho^3-2\rho)\sin \phi$ $9 \Rightarrow \sqrt{8}\rho^3 \sin 3\phi$ $11 \Rightarrow \sqrt{5}(6\rho^4-6\rho^2+1)$ $12 \Rightarrow \sqrt{10}(4\rho^4-3\rho^2)\cos 2\phi$ $14 \Rightarrow \sqrt{10}\rho^4 \cos 4\phi$ $17 \Rightarrow \sqrt{12}(10\rho^5-12\rho^3+3\rho)\sin \phi$ $19 \Rightarrow \sqrt{12}(5\rho^5-4\rho^3)\sin 3\phi$ $21 \Rightarrow \sqrt{12}\rho^5 \sin 5\phi$ $22 \Rightarrow \sqrt{7}(20\rho^6-30\rho^4+12\rho^2-1)$ $24 \Rightarrow \sqrt{14}(15\rho^6-20\rho^4+6\rho^2)\cos 2\phi$ $26 \Rightarrow \sqrt{14}(6\upsilon^6-5\rho^4)\cos 4\phi$ $28 \Rightarrow \sqrt{14}\rho^6 \cos 6\phi$ Numerical data relating to the foregoing embodiments are given above. Although the second optical system of each of the foregoing embodiments includes the single reflecting mirror or the single refracting element, the second optical system causes various problems in manufacture and costs if the second optical system comprises a plurality of optical elements because the second optical system is comparatively large. Therefore, the second optical system of each of the foregoing embodiments comprises the single optical element. The degree of freedom can be increased if the second optical system comprises a plurality of optical elements. All the second optical systems of the foregoing embodiments include rotationally symmetric elements for the same reason. The use of optical element having a free-form surface increases the degree of freedom of design.

INDUSTRIAL APPLICABILITY

The present invention is applicable to the field of oblique-incidence imaging optical systems, particularly, fields of real image formation, such as the fields of projectors, image readers and cameras, and the present invention realizes an oblique-incidence imaging optical system having a half-field angle exceeding 60°.

The invention claimed is:

1. An image optical system in which a plurality of light beams emerging from an image forming devive on a conjugate plane A and having a divergence angle of 10° or greater is made obliquely incident upon a conjugate plane B to form on the conjugate plane B an enlarged image approximately similar to an image formed by the image-forming device, said image optical system comprising:
a first optical system and a second optical system each having an optical axis, a plane mirror provided between the first and second optical system,
the first optical system converging the light beams emerging from the image-forming device on both of a first light beam cross section parallel to principal rays and a second light beam cross section interesting the first light beam cross section,
the plane mirror folding the light beams emerging from the first optical system, and folded light beams are inputted into the second optical system,
the second optical system converging light beams that are reflected by the plane mirror on the conjugate plane B,
the image optical system satisfying the following relationships:

$$S1 \leq L11 \leq S1+S2 \quad \text{(i)}$$

$$S1 \leq L21 \leq S1+S2 \quad \text{(ii)}$$

$$L11/L1n < 0.25 \quad \text{(iii)}$$

$$0 < L21/L2n < 1.5 \quad \text{(iv)}$$

wherein S1 is the distance from the point of emergence on the first optical system to the point of incidence on the second optical system along the optical axis of the first optical system;
wherein S2 is the distance from the point of emergence on the second optical system to the conjugate plane B along the optical axis of the second optical system;
wherein the maximum and minimum of the distance between a point of convergence in the first and second light beam cross sections of a light beam emerging from the first optical system at a point nearest to the optical axis of the first optical system and the point of emergence on the first optical system are L11 and L21, respectively;
wherein the maximum and minimum of the distance between the point of convergence in the first and second light beam cross sections of a light beam emerging from the first optical system at a point remotest from the optical axis of the first optical system and the point of emergence on the first optical system are L1n and L2n.

2. The image optical system according to claim 1, wherein the cross angle of the optical axis of the first optical system and of the second optical system is 90°.

3. A rear projector projecting an image on a screen from behind the screen comprising the image optical system according to claim 1.

4. A rear projector projecting an image on a screen from behind the screen comprising the image optical system according to claim 2.

* * * * *